US006522297B1

(12) United States Patent
Rabinowitz et al.

(10) Patent No.: US 6,522,297 B1
(45) Date of Patent: Feb. 18, 2003

(54) POSITION LOCATION USING GHOST CANCELING REFERENCE TELEVISION SIGNALS

(75) Inventors: Matthew Rabinowitz, Portola Valley, CA (US); James J. Spilker, Jr., Woodside, CA (US)

(73) Assignee: Rosum Corporation, Redwood City, CA (US)

( * ) Notice: Subject to any disclaimer, the term of this patent is extended or adjusted under 35 U.S.C. 154(b) by 0 days.

(21) Appl. No.: 10/159,831

(22) Filed: May 31, 2002

Related U.S. Application Data

(63) Continuation-in-part of application No. 09/887,158, filed on Jun. 21, 2001.
(60) Provisional application No. 60/265,675, filed on Feb. 2, 2001, provisional application No. 60/281,270, filed on Apr. 3, 2001, provisional application No. 60/281,269, filed on Apr. 3, 2001, provisional application No. 60/293,812, filed on May 25, 2001, provisional application No. 60/293,813, filed on May 25, 2001, and provisional application No. 60/343,819, filed on Oct. 23, 2001.

(51) Int. Cl.[7] ................................................. G01S 3/02
(52) U.S. Cl. ....................................... 342/458; 342/463
(58) Field of Search ................................. 342/450, 457, 342/463, 458, 465

(56) References Cited

U.S. PATENT DOCUMENTS

| 4,555,707 A | 11/1985 | Connelly |
| 5,045,861 A | 9/1991 | Duffett-Smith |
| 5,157,686 A | 10/1992 | Omura et al. |
| 5,166,952 A | 11/1992 | Omura et al. |
| 5,481,316 A | 1/1996 | Patel |
| 5,510,801 A | 4/1996 | Egelbrecht et al. |
| 5,920,284 A | 7/1999 | Victor |
| 6,078,284 A | 6/2000 | Levanon |
| 6,094,168 A | 7/2000 | Duffett-Smith et al. |
| 6,107,959 A | 8/2000 | Levanon |
| 6,137,441 A | 10/2000 | Dai et al. |
| 6,317,500 B1 | 11/2001 | Murphy |
| 6,373,432 B1 | 4/2002 | Rabinowitz et al. |
| 6,374,177 B1 | 4/2002 | Lee et al. |

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255–274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59–73.
Spilker, Jr., J.J., "Fundamentals of Signal Tracking Theory," *Global Positioning System: Theory and Applications* (1994), vol. 1, Chapter 7, pp. 245–327.
Van Dierendock, A.J., "GPS Receivers," *Global Positioning System: Theory and Applications* (1995), vol. 1, Chapter 8, pp. 329–407.

(List continued on next page.)

*Primary Examiner*—Dao Phan
(74) *Attorney, Agent, or Firm*—Richard A. Dunning, Jr.

(57) ABSTRACT

A method, apparatus, and computer-readable media for determining the position of a user terminal comprises generating a correlation reference signal based on known characteristics of a chirp-type signal present in a broadcast analog television signal; receiving, at the user terminal, a broadcast analog television signal comprising the chirp-type signal; and correlating the broadcast analog television signal with the correlation reference signal, thereby producing a pseudorange; and wherein the location of the user terminal is determined based on the pseudorange and a location of the transmitter of the broadcast analog television signal.

64 Claims, 29 Drawing Sheets

OTHER PUBLICATIONS

Johnson, Larry, et al., "Low Cost Stand–alone Ghost Cancellation System," *IEEE Transactions on Consumer Electronics*, vol. 40, No. 3, Aug. 1994.

Koo, David, "Properties and Applications of the New Ghost Cancelation Reference Signal," *IEEE*, 1993.

Koo, David, "Developing a New Class of High Energy Ghost Cancellation Reference Signals," *IEEE*, 1992.

Lei, Zhichun, et al., "Adaptive Equalisation of Multipath Interference for Mobile Video Signal Reception," *IEEE Transactions on Broadcasting*, vol. 44, No. 2, Jun. 1998.

Tawil, Victor, et al., "Performance of Television Ghost Canceling Systems Under Field Test Conditions," *IEEE Transactions on Consumer Electronics*, vol. 38, No. 3, Aug. 1992.

Greenberg, Craig B., "Ghost Cancellation System for the US Standard GCR," *IEEE Transactions on Consumer Electronics*, vol. 39, No. 4, Nov. 1993.

POSITION LOCATION USING GHOST CANCELING REFERENCE TELEVISION SIGNALS

CROSS-REFERENCE TO RELATED APPLICATIONS

This application is a continuation-in-part of U.S. Non-provisional patent application Ser. No. 09/887,158, "Position Location using Broadcast Digital Television Signals," by Matthew Rabinowitz and James J. Spilker, filed Jun. 21, 2001, the disclosure thereof incorporated by reference herein.

This application claims the benefit of U.S. Provisional Patent Applications Ser. No. 60/336,542, "Robust Method of Position Location using the New U.S. GCR Signals on the NTSC TV Transmissions," by James J. Spilker Jr., filed Nov. 14, 2001; Ser. No. 60/265,675, "System and Method for Navigation and/or Data Communication Using Satellite and/or Terrestrial Infrastructure," by Matthew Rabinowitz and James J. Spilker, filed Feb. 2, 2001; Ser. No. 60/281,270, "Use of the ETSI DVB Terrestrial Digital TV Broadcast Signals For High Accuracy Position Location in Mobile Radio Links," by James J. Spilker, filed Apr. 3, 2001; Ser. No. 60/281,269, "An ATSC Standard DTV Channel For Low Data Rate Broadcast to Mobile Receivers," by James J. Spilker and Matthew Rabinowitz, filed Apr. 3, 2001; Ser. No. 60/293,812, "DTV Monitor System Unit (MSU)," by James J. Spilker and Matthew Rabinowitz, filed May 25, 2001; Ser. No. 60/293,813, "DTV Position Location Range And SNR Performance," by James J. Spilker and Matthew Rabinowitz, filed May 25, 2001; and Ser. No. 60/343,819, "Processing Analog Television Signals for Positioning Applications," by Matthew Rabinowitz, filed Oct. 23, 2001. The subject matter of all of the foregoing are incorporated herein by reference.

BACKGROUND

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

A system has been proposed using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the techniques disclosed suffer from several major shortcomings. The techniques cannot use signals which are severely attenuated, such that conventional analog TV receivers cannot extract synchronization timing from the horizontal synch or chrominance burst. The techniques cannot accommodate the frequency offset and the short-term instability of the analog transmitter clocks, which would cause severe position errors because the user must sequentially sample one channel after another. The techniques cannot resolve cycle ambiguities in the chrominance carrier, especially in the presence of multipath. Further, the techniques do not enable one to use signals which have variable characteristics that do not effect the performance of an analog television receiver, but considerably affect the performance of a navigation system (for example, the variable shape and duration of the blanking pulse, the horizontal synch pulse, and the chrominance burst). Further, these techniques do not make use of a signal which allows for precise ranging to an accuracy of a few meters in the presence of multipath.

SUMMARY

Implementations of the present invention describe signal processing techniques for position location using the ghost canceling reference (GCR) signal present in analog broadcast television (TV) Signals. These techniques can track signals which are below the noise floor, and for which a conventional television signal receiver would be unable to acquire timing information. These techniques extract timing information in a manner far more precise than a typical television receiver. These techniques also accommodate all the variable characteristics of the analog TV signal, such that these variations do not affect the precision of position location.

These techniques are usable at a range from the transmitter much greater than the typical analog TV reception range. Because of the high power of the analog TV signals, these techniques can even be used indoors by handheld receivers, and thus provide a solution to the position location needs of the Enhanced 911 (E911) system.

The techniques disclosed herein provide several advantages. The techniques are effective at low received signal-to-noise ratio (SNR) consistent with reception of TV signals from distant TV transmitters as required for position location. For small mobile handsets with low antenna gain and indoor environment this is an absolute requirement. The techniques can discriminate against multipath signals because of the wide bandwidth GCR signal. The techniques permit sequential use of a single receive element so that a single set of electronic circuits can be time-shared to observe multiple TV signals, thereby substantially reducing cost.

In general, in one aspect, the invention features a method, apparatus, and computer-readable media for determining the position of a user terminal. It comprises generating a correlation reference signal based on known characteristics of a broadcast analog television ghost canceling reference signal; receiving, at the user terminal, a broadcast analog television signal comprising the ghost canceling reference signal; and correlating the broadcast analog television signal with the correlation reference signal, thereby producing a pseudorange; and wherein the location of the user terminal is determined based on the pseudorange and a location of the transmitter of the broadcast analog television signal.

Particular implementations can include one or more of the following features. Implementations can comprise determining the location of the user terminal based on the pseudorange and the location of the transmitter of the broadcast analog television signal. Implementations can comprise determining the location of the user terminal based on the pseudorange, a pseudorange computed based on a broadcast digital television signal, and the locations of the transmitters of the broadcast analog television signal and the broadcast digital television signal. Implementations can comprise identifying the peak of the result of the correlating, thereby producing the pseudorange. The position of the user terminal is determined by adjusting the pseudoranges based on a difference between a transmitter clock at the transmitter of the broadcast analog television signal and a known time reference, and determining the position of,the user terminal based on the adjusted pseudorange and the location of the TV transmitter. Implementations can comprise determining a further pseudorange based on a further broadcast analog television signal; and projecting the pseudorange and the further pseudorange to an instant of time, thereby eliminating any first order term in the clock of the user terminal. Implementations can comprise tracking the ghost canceling reference signal using a time-gated delay-lock loop.

In general, in one aspect, the invention features a method, apparatus, and computer-readable media for determining the position of a user terminal. It comprises generating a correlation reference signal based on known characteristics of a chirp-type signal present in a broadcast analog television signal; receiving, at the user terminal, a broadcast analog television signal comprising the chirp-type signal; and correlating the broadcast analog television signal with the correlation reference signal, thereby producing a pseudorange; and wherein the location of the user terminal is determined based on the pseudorange and a location of the transmitter of the broadcast analog television signal.

Particular implementations can include one or more of the following features. The chirp-type signal is a vertical interval test signal. The chirp-type signal is ghost canceling reference signal A, ghost canceling reference signal B, or ghost canceling reference signal C. Implementations can comprise determining the location of the user terminal based on the pseudorange and the location of the transmitter of the broadcast analog television signal. Implementations can comprise determining the location of the user terminal based on the pseudorange, a pseudorange computed based on a broadcast digital television signal, and the locations of the transmitters of the broadcast analog television signal and the broadcast digital television signal. Implementations can comprise identifying the peak of the result of the correlating, thereby producing the pseudorange. The position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter. Implementations can comprise determining a further pseudorange based on a further broadcast analog television signal; and projecting the pseudorange and the further pseudorange to an instant of time, thereby eliminating any first order term in the clock of the user terminal. Implementations can comprise tracking the chirp-type signal using a time-gated delay-lock loop.

The details of one or more implementations are set forth in the accompanying drawings and the description below. Other features will be apparent from the description and drawings, and from the claims.

Figure 1:
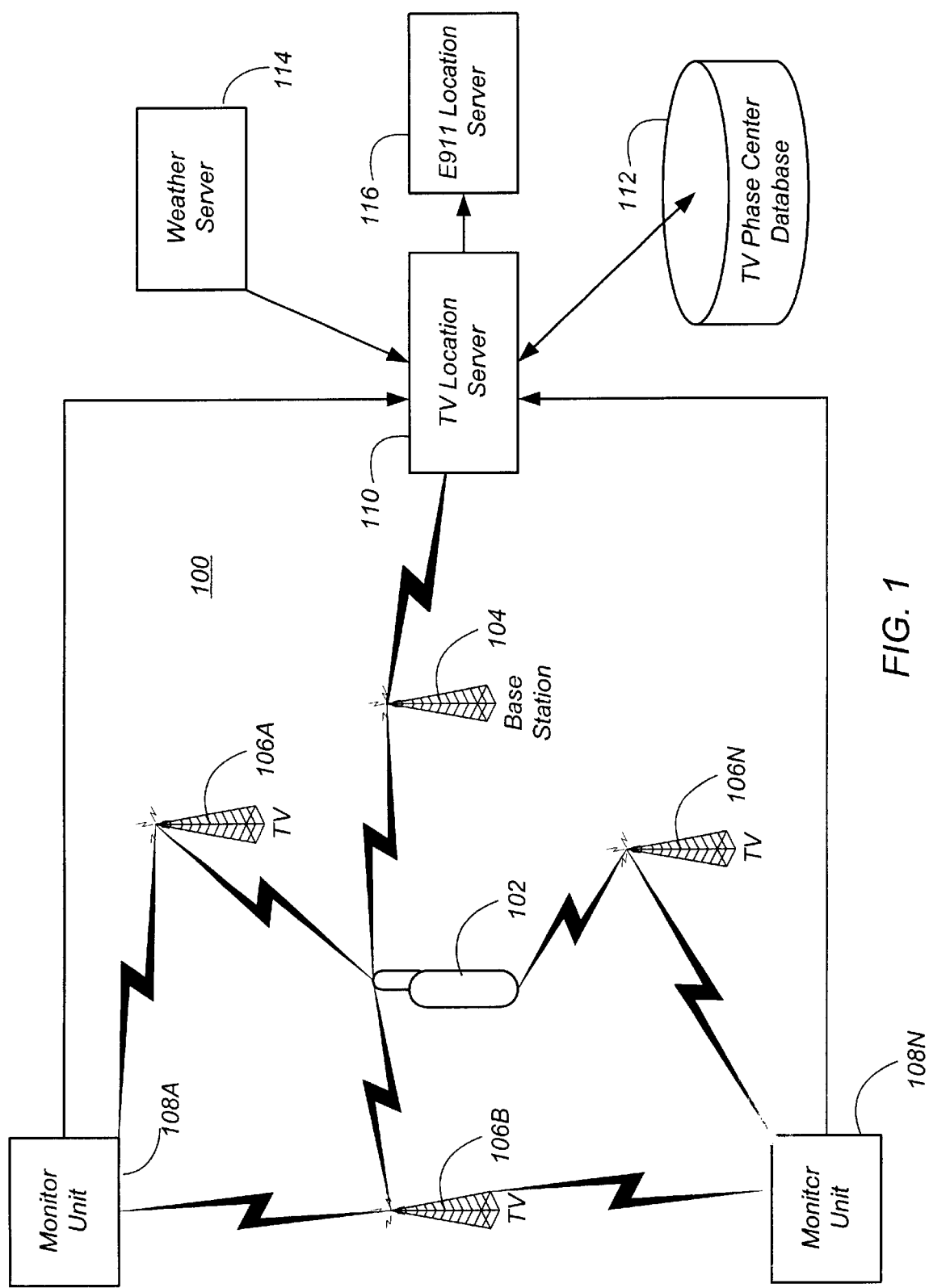
FIG. 1 shows an example implementation including a user terminal that communicates over an air link with a base station.

The leading digit(s) of each reference numeral used in this specification indicates the number of the drawing in which the reference numeral first appears.

DETAILED DESCRIPTION

As used herein, the term "server" generally refers to an electronic device or mechanism, and the term "message" generally refers to an electronic signal representing a digital message. As used herein, the term "mechanism" refers to hardware, software, or any combination thereof. These terms are used to simplify the description that follows. The servers and mechanisms described herein can be implemented on any standard general-purpose computer, or can be implemented as specialized devices.

Implementations of the invention are described below with reference to the NTSC (National Television System Committee) standard, which has been adopted in the United States, Canada, Mexico and elsewhere. Recently, a new modification to the United States NTSC analog TV system has been proposed, adopted by the ATSC, and is now being incorporated in analog TV transmissions. This modification is called the Ghost Canceling Reference (GCR) signal for NTSC, and is present in most NTSC analog broadcast television signals. This purpose of the new GCR signal is to allow television sets to reduce or eliminate "ghosts" caused by multipath in the received TV signal. These ghosts can and often do severely degrade analog TV reception. The inventors propose to utilize this new GCR signal for a purpose completely different from its intended purpose, namely, to use it for precise positioning of mobile user terminals such as cellular handsets. While these techniques are discussed with reference to the NTSC TV signal, they are equally applicable to other television signals, such as those used in Europe, Japan and Korea, that employ similar GCR signals.

Use of GCR for Precise Positioning

In the NTSC standard, the GCR signal is a wide bandwidth "chirp" type signal that is inserted periodically in line 19 of the NTSC vertical blanking pulse. This GCR signal is a sine wave with a linearly increasing frequency ranging from near zero to 4.2 MHz during an approximate time duration of 35.5 microseconds. The GCR signal has a very narrow autocorrelation width of a small fraction of a microsecond, a unique feature that is not available in the standard elements of the NTSC analog TV signal, such as the horizontal and vertical blanking pulses. Note that other GCR standards used around the world have different formats to the NTSC GCR signal. For example, one GCR signal which differs from the NTSC standard involves a Pseudo-random Noise (PN) sequence modulated onto a segment of the vertical blanking pulse. This signal also has a very narrow autocorrelation function and it will be clear to one skilled in the art, after reading this disclosure, how to employ that signal for positioning using a technique similar to that described herein. Another type of GCR signal which differs from the NTSC standard involves a bar signal with a rise waveform characterized by a sine function. Notice that the first derivative of this signal has a narrow autocorrelation function. After reading this disclosure, it will be clear to one skilled in the art how to employ this signal for positioning using a technique similar to that described herein for the NTSC GCR signal.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any mechanism capable of implementing the TV position location described. Examples of user terminals include personal digital assistants (PDAs), mobile phones, cars and other vehicles, and any mechanism which could include a chip or software implementing TV position location. It is not intended to be limited to objects which are "terminals" or which are operated by "users."

Position Location Performed by a TV Location Server

Figure 2:
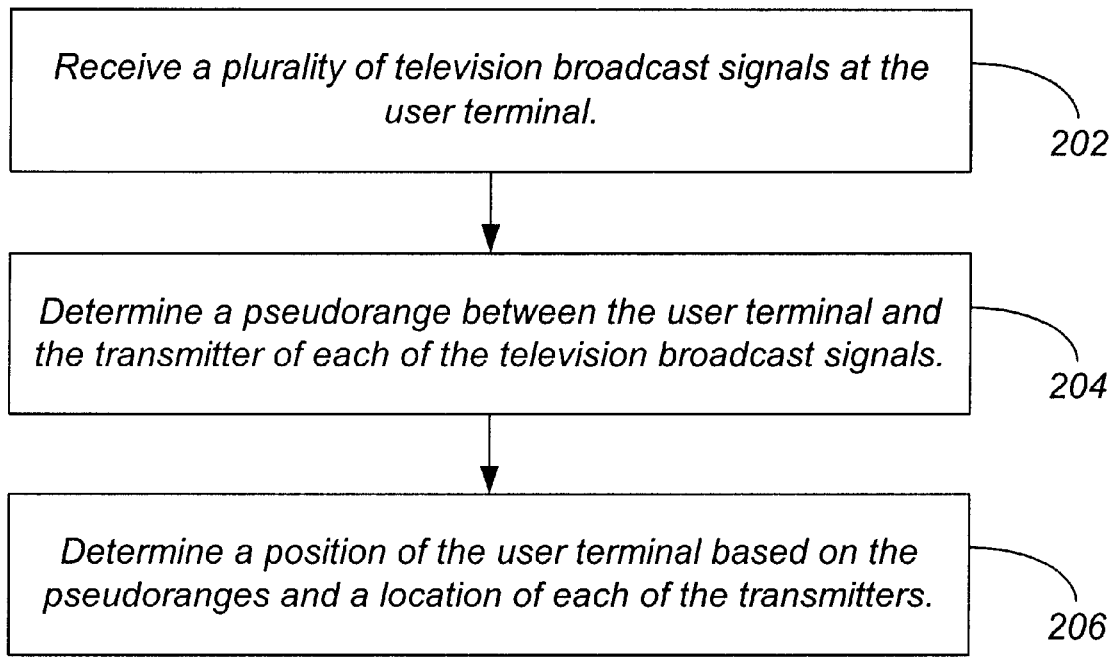
FIG. 2 illustrates an operation of the implementation of FIG. 1.

FIG. 2 illustrates an operation of implementation 100. User terminal 102 receives TV signals from a plurality of TV transmitters 106A and 106B through 106N (step 202). Various methods can be used to select which TV channels to use in position location. In one implementation, a TV location server 110 tells user terminal 102 of the best TV channels to range from. In one implementation, user terminal 102 exchanges messages with TV location server 110 by way of base station 104. In one implementation user terminal 102 selects TV channels to monitor based on the identity of base station 104 and a stored table correlating base stations and TV channels. In another implementation, user terminal 102 can accept a location input from the user that gives a general indication of the area, such as the name of the nearest city; and uses this information to select TV channels for processing. In one implementation, user terminal 102 scans available TV channels to assemble a fingerprint of the location based on power levels of the available TV channels. User terminal 102 compares this fingerprint to a stored table that matches known fingerprints with known locations to determine the location and to select TV channels for processing. In another implementation, the user terminal 102 takes pseudorange measurements on all of the available signals, and communicates these pseudoranges to location server 110, which determines the position of the user terminal 102 based on the locations of the TV transmitters 106.

User terminal 102 determines a pseudo-range between the user terminal 102 and each TV transmitter 106 (step 204). Each pseudo-range represents the time difference (or equivalent distance) between a time of transmission from a transmitter 108 of a GCR signal burst within a broadcast TV signal and a time of reception at the user terminal 102 of the GCR signal burst, as well as a clock offset between the user terminal and the monitor units 108, and a clock offset in the time of transmission of the component of the TV broadcast signal.

User terminal 102 transmits the pseudo-ranges to TV location server 110. In one implementation, TV location server 110 is implemented as a general-purpose computer executing software designed to perform the operations described herein. In another implementation, TV location server 110 is implemented as an ASIC (application-specific integrated circuit). In one implementation, TV location server 110 is implemented within or near base station 104.

The TV signals are also received by a plurality of monitor units 108A through 108N. Each monitor unit can be implemented as a small unit including a transceiver and processor, and can be mounted in a convenient location such as a utility pole, TV transmitters 106, or base stations 104. In one implementation, monitor units are implemented on satellites.

Monitor units 108 measure information related to the transmission times of each of the GCR signal bursts. Monitor units 108 are generally controlled by temperature-compensated crystal oscillators or rubidium standard for accurate measurements. Monitor units 108 transmits the information related to the transmission times to TV location server 110. User terminal 102 tracks the GCR signals emitted by each TV transmitter 106 and measure a pseudo-range for each of the TV transmitters. User terminal 102 transmits the measured pseudoranges to TV location server 110. TV location server 110 then combines the information related to the transmission times and pseudoranges to compute the position of user terminal 102. The position of user terminal 102 is then relayed back to the user terminal 102. User terminal 102 can then send this information to an E911 service operator in an emergency, or use the information for other purposes.

Each monitor unit 108 measures, for each of the TV transmitters 106 from which it receives TV signals, a time offset between the local clock of that TV transmitter and a reference clock. In one implementation the reference clock is derived from GPS signals. The use of a reference clock permits the determination of the time offset for each TV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives TV signals from all of the same TV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset}=a+b(t-T)+c(t-T)^2 \qquad (1)$$

that can be described by a, b, c, and T. In either implementation, each measured time offset is transmitted periodically to the TV location server using the Internet, a secured modem connection or the like. In one implementation, the location of each monitor unit 108 is determined using GPS receivers.

TV location server 110 receives information describing the phase center (that is, the location) of each TV transmitter 106 from a database 112. In one implementation, the phase center of each TV transmitter 106 is measured by using monitor units 108 at different locations to measure the phase center directly. In another implementation, the phase center of each TV transmitter 106 is measured by surveying the antenna phase center.

In one implementation, TV location server 110 receives weather information describing the air temperature, atmospheric pressure, and humidity in the vicinity of user terminal 102 from a weather server 114. The weather information is available from the Internet and other sources such as NOAA. TV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

TV location server 110 can also receive from base station 104 information which identifies a general geographic location of user terminal 102. For example, the information can identify a cell or cell sector within which a cellular telephone is located. This information is used for ambiguity resolution, as described below.

Figure 3:
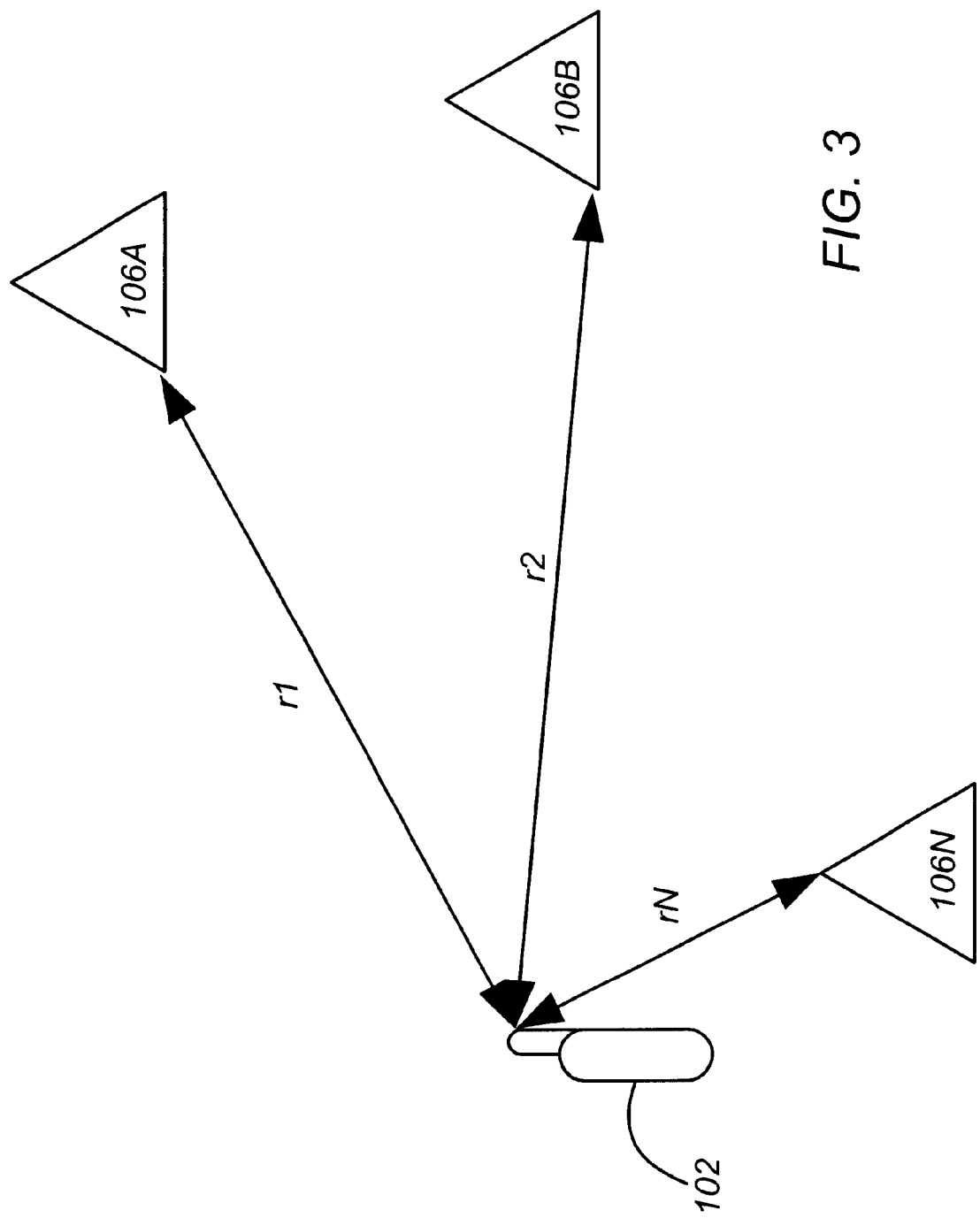
FIG. 3 depicts the geometry of a position determination using three TV transmitters.

In one implementation, TV location server 110 determines a position of the user terminal based on the pseudo-ranges and a location of each of the transmitters (step 206). FIG. 3 depicts the geometry of a position determination using three TV transmitters 106. TV transmitter 106A is located at position (x1, y1). The range between user terminal 102 and TV transmitter 106A is r1. TV 106B transmitter is located at position (x2, y2). The range between user terminal 102 and TV transmitter 106B is r2. TV transmitter 106N is located at position (xN, yN). The range between user terminal 102 and TV transmitter 106N is rN.

TV location server 110 can adjust the value of each pseudo-range according to the tropospheric propagation velocity. In addition, the TV location server adjusts the pseudoranges for the clock offset for the corresponding TV transmitter 106 as described in equation (1) above. For example, assume that the TV transmitters 106 have clock offsets which result in frequency offsets of roughly 1 part in $10^6$, and one second separates the pseudorange measurements at the user terminal 102 for transmitters 106A and 106N. If these measurements are not corrected according to the clock offset as modeled in equation (1), an effective distance error of roughly 300 meters between the two measurements will result. The TV location server 110 uses the phase center information from database 112 to determine the position of each TV transmitter 106.

Now a simplified position location process is described, where it is assumed that the clock offset of the user device can be modeled by a single constant offset T. This assumption is true if the user measurements are projected to the same instant of time, or if the user clock is stabilized using a clock reference from the cellular base station or a stable TV transmitter. User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and prN are given by $$pr1=r1+T \qquad (2a)$$

$$pr2=r2+T \qquad (3a)$$

$$prN=rN+T \qquad (4a)$$

where the clock offset T is in units of distance. Namely, T represents a timing offset multiplied by the speed of light. The three ranges can be expressed as $$r1=|X-X1| \qquad (5)$$

$$r2=|X-X2| \qquad (6)$$

$$rN=|X-XN| \qquad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and AN represents the two-dimensional vector position (xN, yN) of DTV transmitter 106N. These relationships produce three equations in which to solve for the three unknowns x, y, and T.

Now, techniques for projecting the measurements at the user terminal 102 to a common instant in time are described.

Note that this is not necessary if the clock of the user terminal 102 is stabilized or corrected using a signal from the cellular base station or a TV transmitter 106. When the user clock is not stabilized, or corrected, the user clock offset can be considered to be a function of time, T(t). For a small time interval, Δ, the clock offset, T(t), can be modeled by a constant and a first order term. Namely, $$T(t+\Delta) = T(t) + \frac{\partial T}{\partial t}\Delta \qquad (8)$$

Now reconsider equations (2a)–(4a) treating the clock offset as a function of time. Consequently, the pseudorange measurements are also a function of time. For clarity, assume that the ranges remain essentially constant over the interval Δ. The pseudorange measurements can then be described as:

$$pr1(t1)=r1+T(t1) \qquad (2b)$$

$$pr2(t2)=r2+T(t2) \qquad (3b)$$

$$prN(tN)=rN+T(tN) \qquad (4b)$$

In one embodiment, the user terminal 102 commences with an additional set of pseudorange measurements at some time Δ after the initial set of measurements. These measurements can be described:

$$pr1(t1+\Delta) = r1 + T(t1) + \frac{\partial T}{\partial t}\Delta \qquad (2c)$$

$$pr2(t2+\Delta) = r2 + T(t2) + \frac{\partial T}{\partial t}\Delta \qquad (3c)$$

$$prN(tN+\Delta) = rN + T(tN) + \frac{\partial T}{\partial t}\Delta \qquad (4c)$$

The user terminal 102 then projects all the pseudorange measurements to some common point in time so that the effect of the first order term is effectively eliminated. For example, consider if some common reference time t0 is used. Applying equations (2b–4b) and (2c–4c) it is straightforward to show that we can project the measurements to a common instant of time as follows:

$$pr1(t0) = pr1(t1) + [pr1(t1+\Delta) - pr1(t1)](t0-t1)/\Delta \qquad (2d)$$

$$pr2(t0) = pr2(t2) + [pr2(t2+\Delta) - pr2(t2)](t0-t2)/\Delta \qquad (3d)$$

$$prN(t0) = prN(tN) + [prN(tN+\Delta) - prN(tN)](t0-tN)/\Delta \qquad (4d)$$

These projected pseudorange measurements are communicated to the location server where they are used to solve the three unknowns x, y, and T. Note that the projection in equations (2d–4d) is not precise, and second order terms are not accounted for. However the resulting errors are not significant. One skilled in the art will recognize that second order and higher terms can be accounted for by making more than two pseudorange measurements for each projection. Notice also that there are many other approaches to implementing this concept of projecting the pseudorange measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each DTV transmitter 106. These tracking loops effectively interpolate between pseudorange measurements. The state of each of these tracking loops is sampled at the same instant of time.

In another implementation, user terminal 102 does not compute pseudo-ranges, but rather takes measurements of the TV signals that are sufficient to compute pseudo-range, and transmits these measurements to TV location server 110. TV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by TV location server 110, base station 104, one or more TV transmitters 106, or any combination thereof. User terminal 102 then measures the pseudo-ranges and solves the simultaneous equations as described above. This implementation is now described.

User terminal 102 receives the time offset between the local clock of each TV transmitter and a reference clock. User terminal 102 also receives information describing the phase center of each TV transmitter 106 from a database 112.

User terminal 102 receives the tropospheric propagation velocity computed by TV locations server 110. In another implementation, user terminal 102 receives weather information describing the air temperature, atmospheric pressure, and humidity in the vicinity of user terminal 102 from a weather server 114 and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives TV signals from a plurality of TV transmitters 106 and determines a pseudo-range between the user terminal 102 and each TV transmitter 106. User terminal 102 then determines its position based on the pseudo-ranges and the phase centers of the transmitters.

In any of these of the implementations, should only two TV transmitters be available, the position of user terminal 102 can be determined using the two TV transmitters and the offset T computed during a previous position determination. The values of T can be stored or maintained according to conventional methods.

In one implementation, base station 104 determines the clock offset of user terminal 102. In this implementation, only two TV transmitters are required for position determination. Base station 104 transmits the clock offset T to TV location server 110, which then determines the position of user terminal 102 from the pseudo-range computed for each of the TV transmitters.

In another implementation, when only one or two TV transmitters are available for position determination, GPS is used to augment the position determination.

Figure 4:
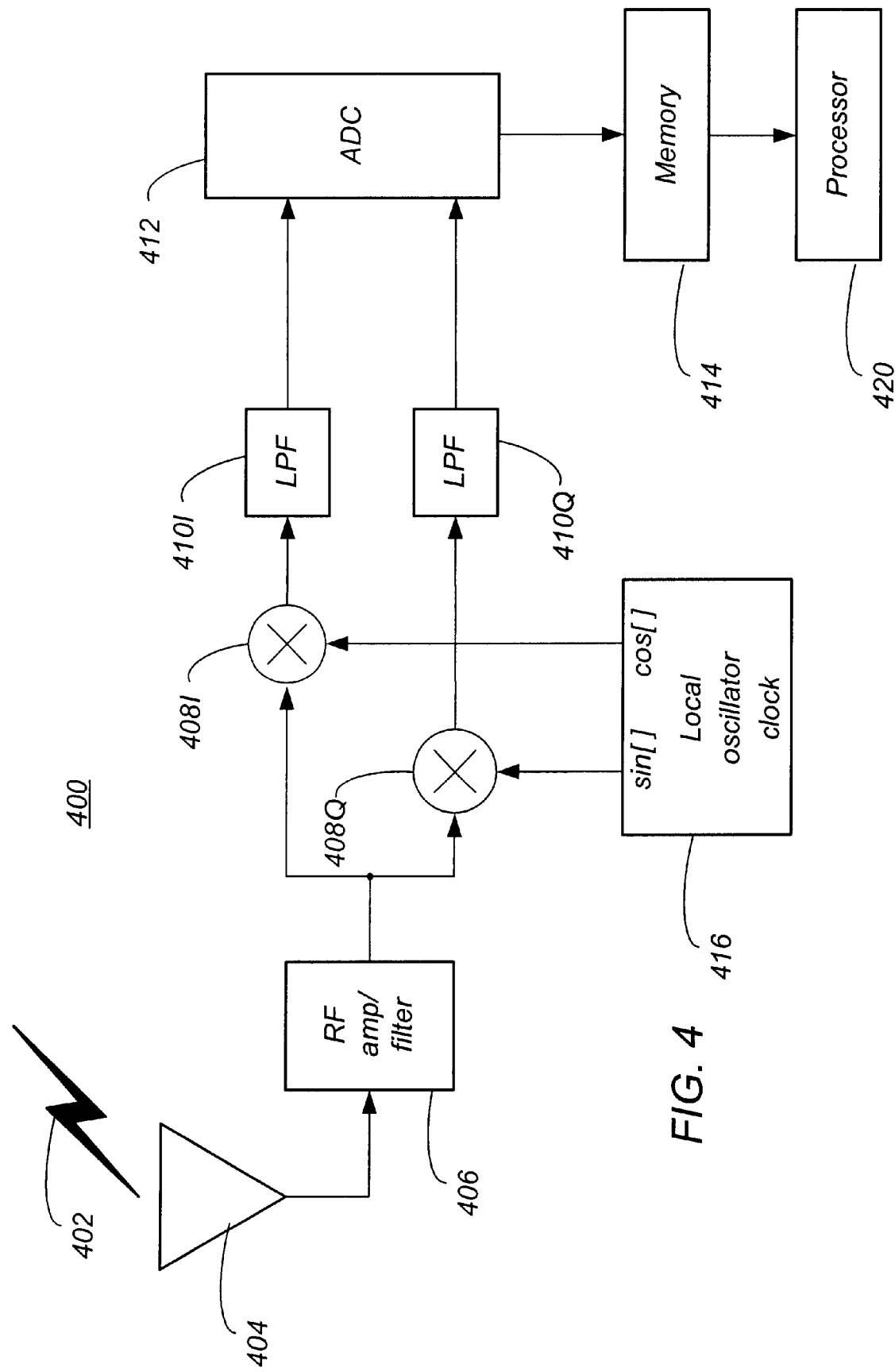
FIG. 4 depicts a receiver for use in taking samples of received broadcast analog TV signals according to one implementation.

FIG. 4 depicts a receiver 400 for use in taking samples of received broadcast analog TV signals according to one implementation. In one implementation, sampler 400 is implemented within user terminal 102. Techniques for implementing such a receiver in a small wireless device are described in U.S. Provisional Patent Application Ser. No. 60/309,267, "Methodology and System for Tracking the Digital Television Signal with Application to Positioning Wireless Devices," by James Omura, James J. Spilker Jr., and Matthew Rabinowitz, filed Jul. 31, 2001. The sampling rate is sufficiently high to obtain an accurate representation of the TV signal, as would be apparent to one skilled in the art.

Receiver 400 receives a TV signal 402 at an antenna 404. A radio frequency (RF) amp/filter 406 amplifies and filters the received TV signal. A local oscillator clock 416 and mixers 408I and 408Q downconvert the signal to produce in-phase (I) and quadrature (Q) samples, respectively. The I and Q samples are respectively filtered by low-pass filters (LPF) 410I and 410Q. One approach to performing the downconversion is to use a direct down-conversion architecture where the signals are converted directly down to baseband. This allows very inexpensive RF (radio frequency) hardware, and enables the filters 410 to effectively reject adjacent channel interference. An analog-to-digital converter (ADC) 412 converts the I and Q samples to digital form. The digital I and Q samples are stored in a memory 414.

GCR Signal Characteristics

Figure 5:
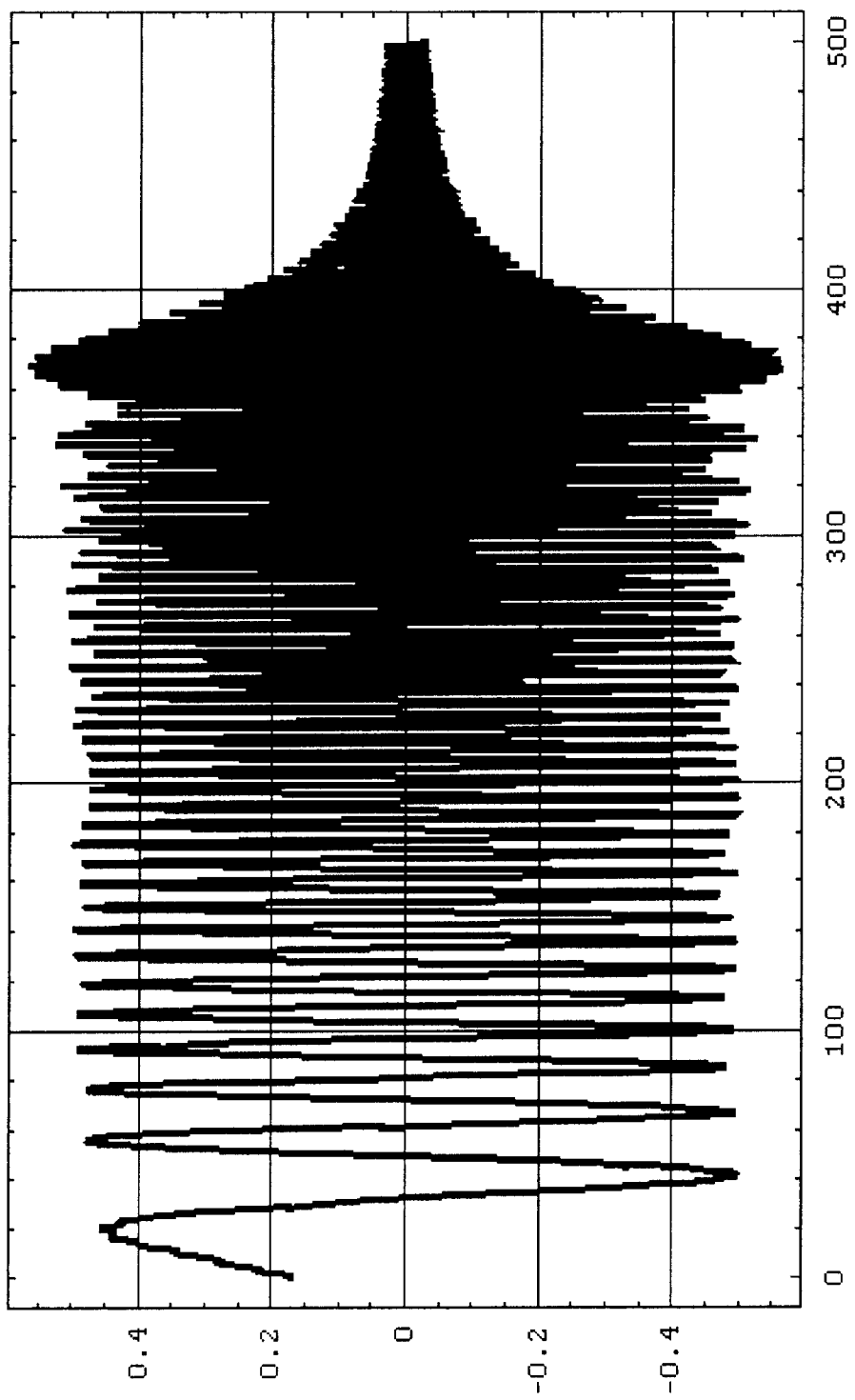
FIG. 5 shows a computer-generated NTSC GCR signal burst.

FIG. 5 shows a computer-generated NTSC GCR signal burst. This signal is described in detail for one implementation. Other forms of GCR signals are briefly described at the end of this section. The NTSC GCR signal is a chirp-like signal that has been added to the US NTSC analog signal for purposes of canceling ghosts in the displayed TV images caused by multipath reflections in the received signal. The GCR signal is a sine wave burst of approximately 35.5 microseconds duration that has a linearly varying frequency that rises in frequency to about 4.2 MHz. The horizontal line rate is 15.73265 kHz. The GCR signal occurs every vertical blanking pulse interval, which alternates between 262 and 263 horizontal lines. The GCR signal is transmitted in line 19 of the vertical blanking interval. The GCR waveform is transmitted in an 8-frame superframe. The sign of the GCR signal takes the form {+,−,+,−,−,+,−,+}. Thus the GCR signal has zero average value over the 8-frame super frame. The GCR signal is further described in International Telecommunication Union (ITU) Recommendation ITU-R BT.1124-3, Reference Signals For Ghost Canceling In Analogue Television Systems, (Question ITU-R 55/11), (1994-1995-1998-2001), the disclosure thereof incorporated by reference herein in its entirety.

The GCR signal burst is normally used by digital processors within TV receivers to remove ghost images from the TV screen. Implementations of the present invention use the GCR signal burst for a completely different reason, namely precise position location.

Figure 6:
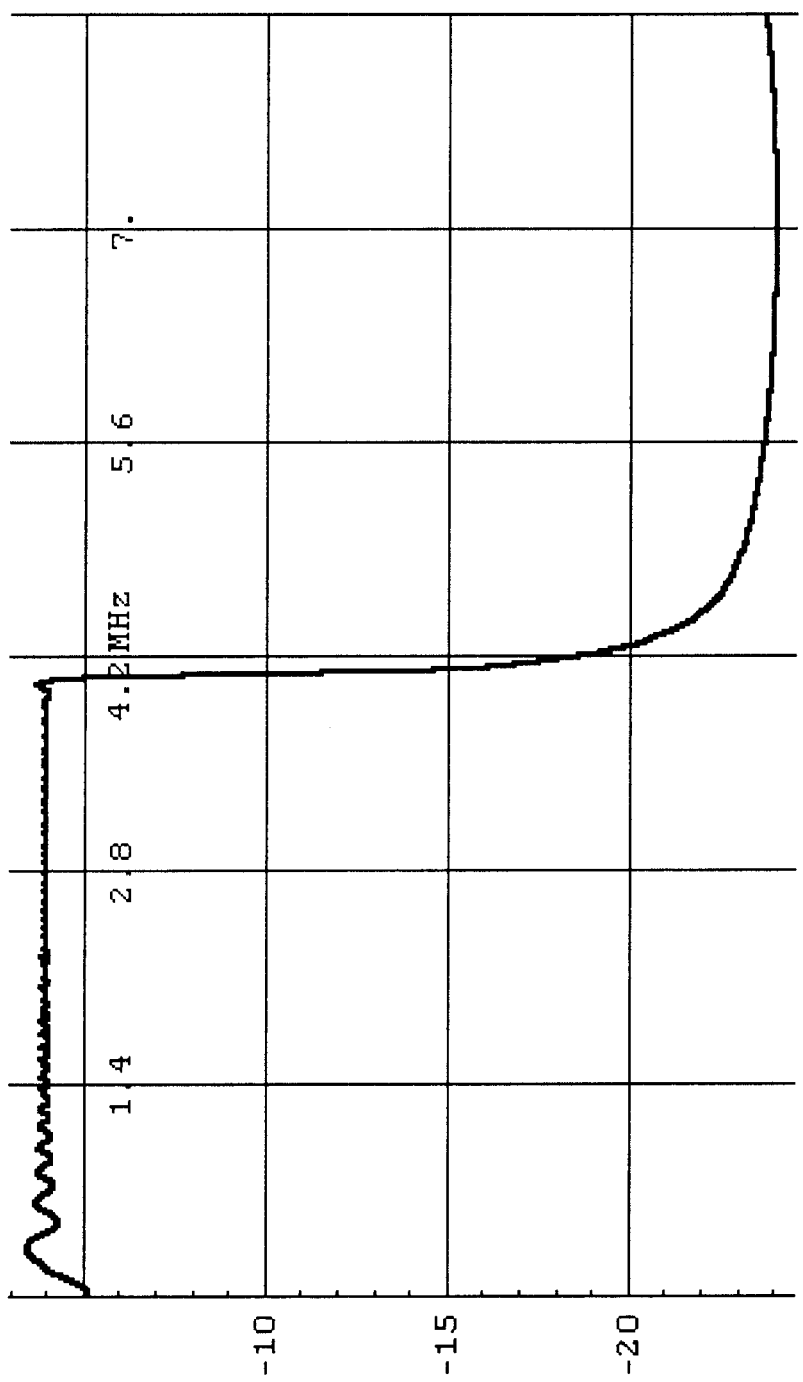
FIG. 6 shows the approximate power spectral density of the GCR burst signal.

FIG. 6 shows the approximate power spectral density of the GCR burst signal. The vertical scale is in dB. This chirp-type GCR signal is similar to that used in some broadband radar, and has a broadband relatively flat spectrum.

Figure 7:
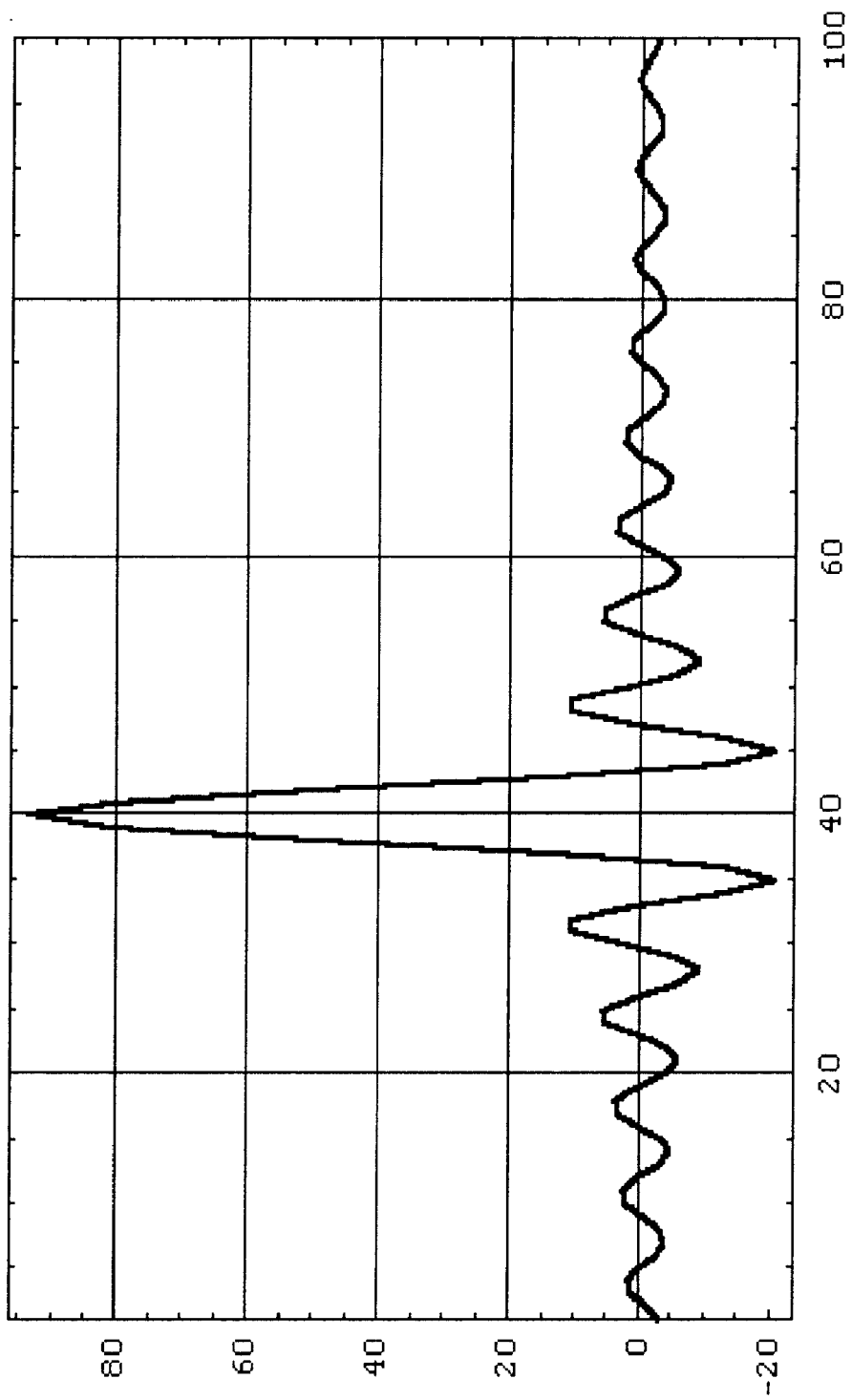
FIG. 7 shows the computed autocorrelation function for the GCR signal when sampled at a sample rate of 28.64 mega-symbols per second.
Figure 8:
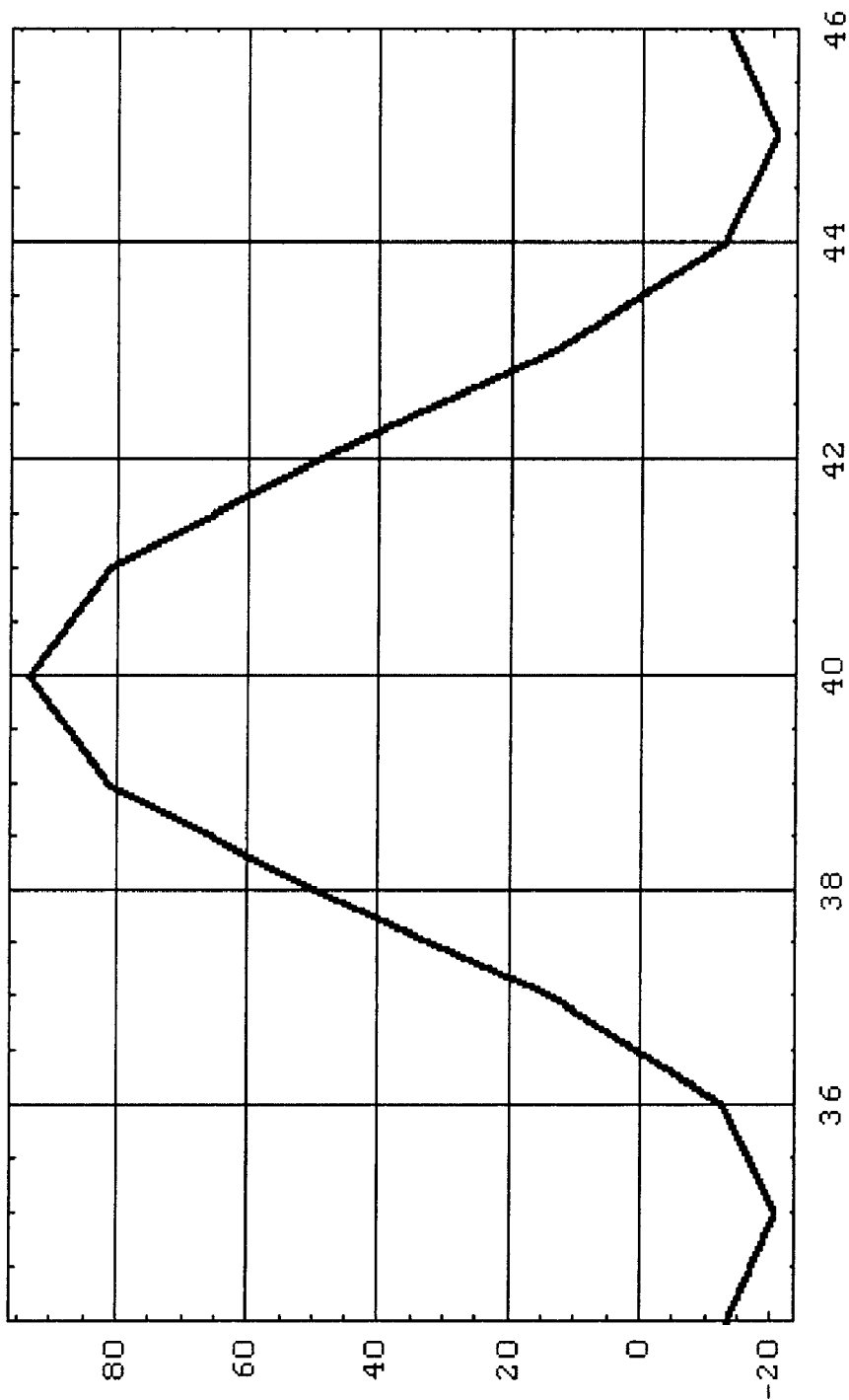
FIG. 8 shows an expanded view of the GCR autocorrelation function shown in FIG. 7.

Not only is the GCR signal burst transmitted at a high power level and with high energy, taking almost all of a single line of TV, but its wide-spectrum bandwidth gives it a narrow autocorrelation function with very small sidelobes and other ambiguities. Further, because it is transmitted only once per frame (in the vertical blanking interval) even relatively large multipath reflections cause little degradation. FIG. 7 shows the computed autocorrelation function for the GCR signal when sampled at a sample rate of 28.64 megasymbols per second. Thus the samples are spaced 34.92 nanoseconds or roughly 35 feet. FIG. 8 shows an expanded view of the GCR autocorrelation function shown in FIG. 7. The narrow width of the GCR signal burst autocorrelation function makes the GCR signal burst useful for precision pseudorange measurements and further mitigates multipath effects. This feature is not available in previous versions of the NTSC signal without the GCR signal.

GCR Modulation on the NTSC Signal

Figure 9:
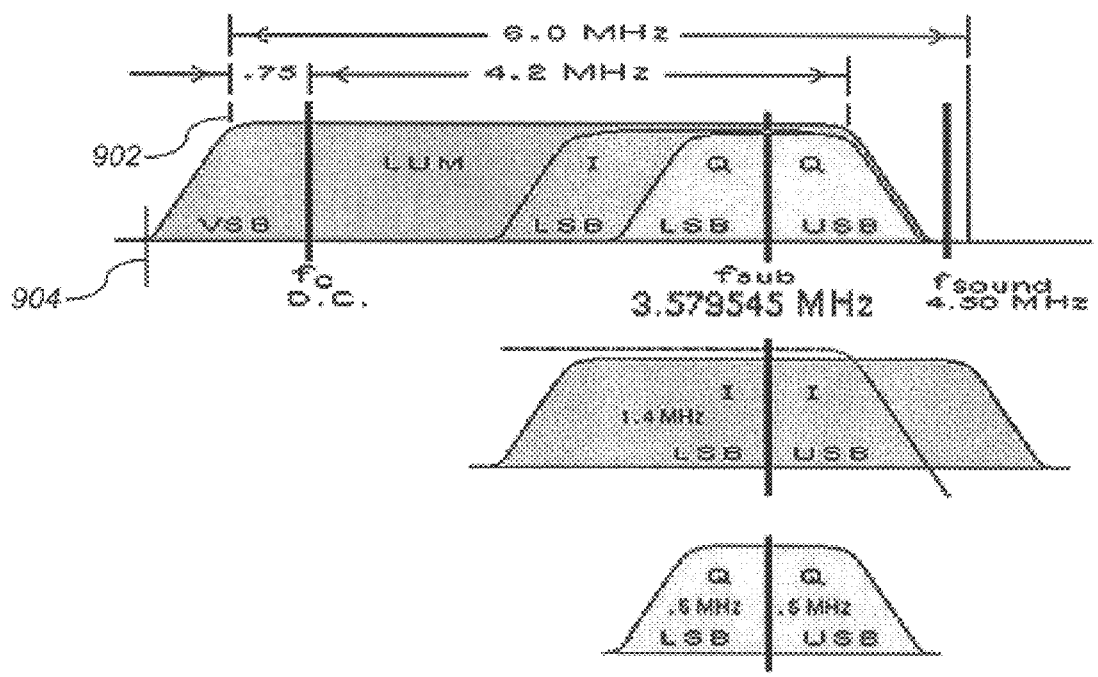
FIG. 9 presents the NTSC signal spectrum as shown in the NTSC signal documentation.

FIG. 9 presents the NTSC signal spectrum as shown in the NTSC signal documentation. The luminance carrier is shown at 1.25 MHz above the lower edge of the 6 MHz band. However, FIG. 9 is in error; the luminance carrier $f_c$ is shown at 0.75 MHz above break-point 902, but is in reality located 1.25 MHz above the lower edge 904 of the 6 MHz channel. The chrominance subcarrier is 3.579545 MHz above the luminance carrier. The video luminance information used for the GCR signal extends to 4.2 MHz on the upper sideband and only to roughly 0.75 MHz on the lower sideband.

The GCR signal is transmitted as part of the luminance carrier as amplitude modulation on a carrier 1.25 MHz above the lower edge of the allocated 6 MHz channel. Some of the NTSC channels are offset slightly from an exact 6 MHz increment. The luminance modulation and horizontal and vertical synchronization/blanking are vestigial sideband modulated where the lower sideband extends only to approximately 0.75 MHz and the upper sideband extends roughly to 4.2 MHz. Thus the GCR signal has 3 dB more energy in the lower 0.75 MHz than it does above that frequency. The chrominance signal does not appear at the same time as the GCR signal so that there is no interference between the two, even though their spectra overlap.

Experimental Confirmation of the GCR Signal

Figure 10:
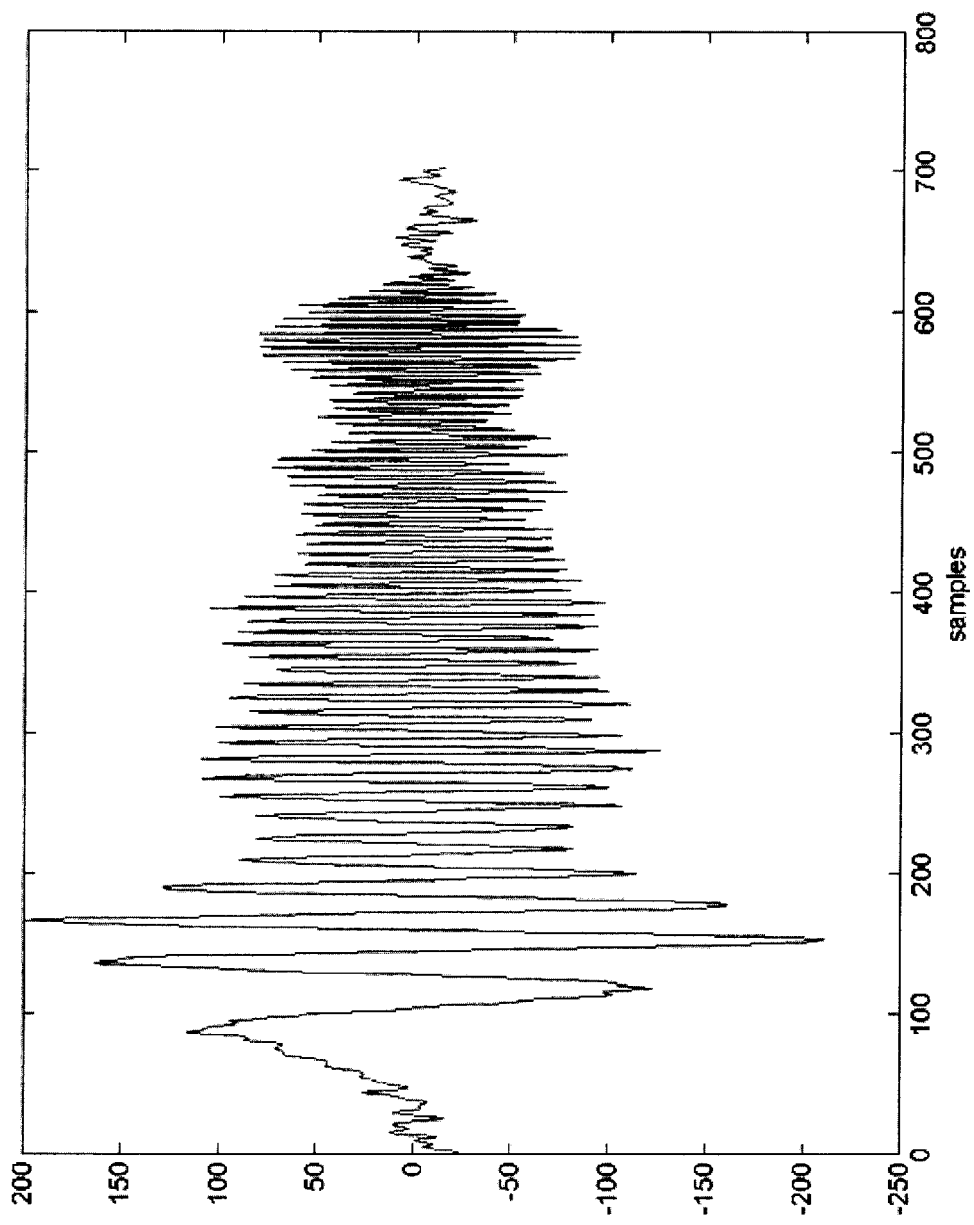
FIG. 10 shows the received in-phase component of the GCR signal, for Channel 44, an NTSC signal in the San Francisco Bay area.
Figure 11:
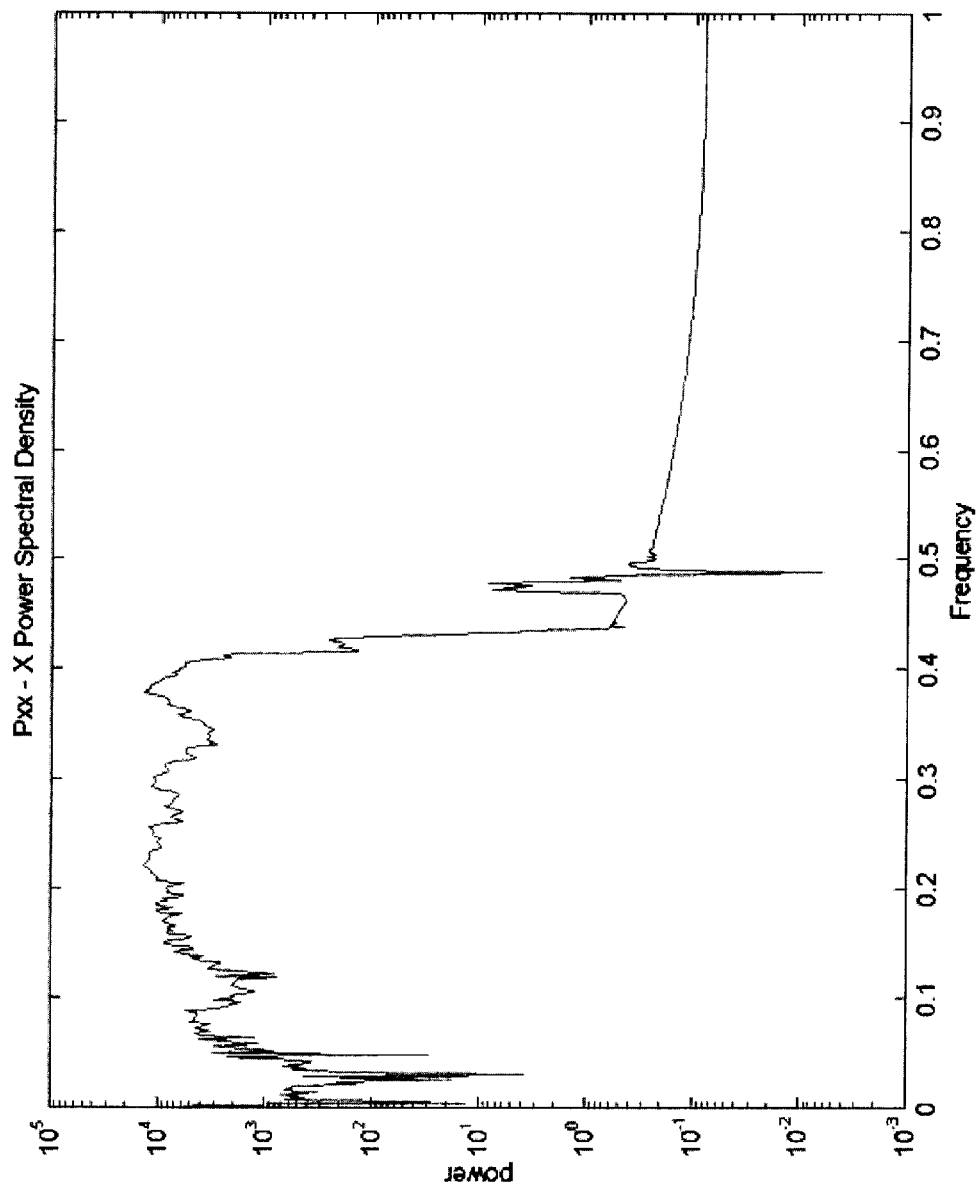
FIG. 11 shows the received spectrum of the GCR signal, including some effects of multipath fading.
Figure 12:
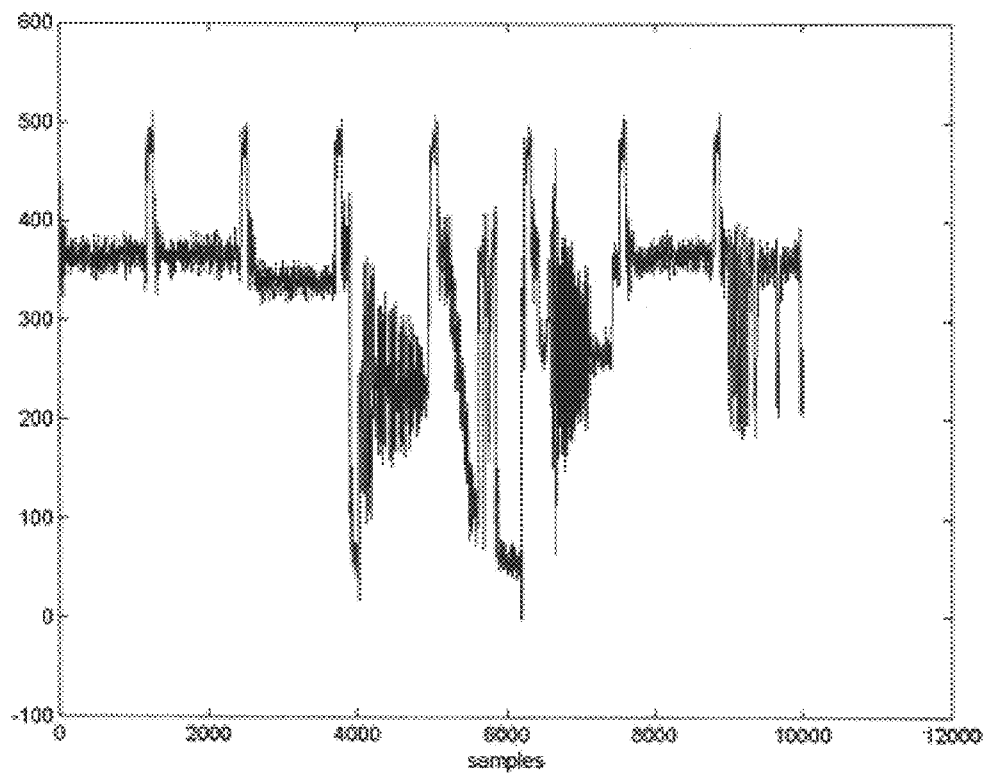
FIG. 12 shows the vertical blanking interval including horizontal pulses adjacent to the line containing the GCR signal.
Figure 13:
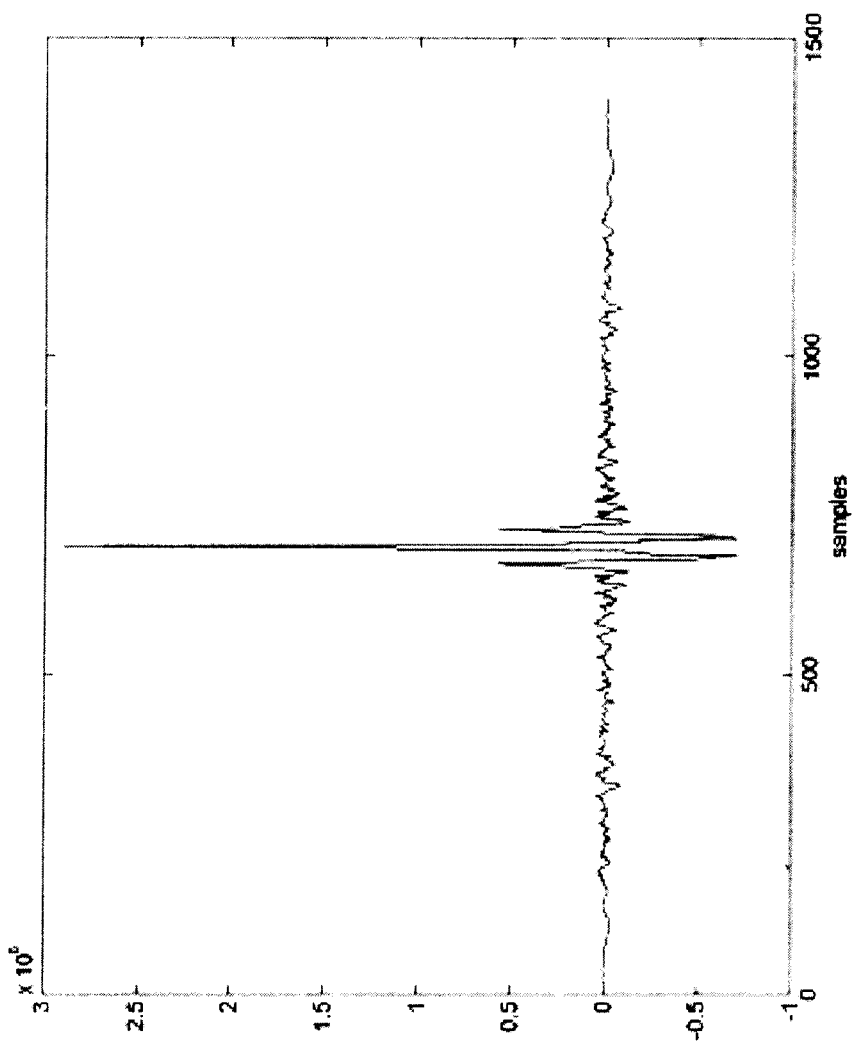
FIG. 13 shows the recovered GCR autocorrelation function.

The expected performance of the GCR signal was confirmed by examining Channel 44, an NTSC signal in the San Francisco Bay area. FIG. 10 shows the received in-phase component of the GCR signal. The signal differs from the ideal GCR signal due to interference signals, noise and multipath fading, to name a few of the affects. FIG. 11 shows the received spectrum of the GCR signal, including some effects of multipath fading. FIG. 12 shows the vertical blanking interval including horizontal pulses adjacent to the line containing the GCR signal. FIG. 13 shows the recovered GCR autocorrelation function. Note the narrow autocorrelation characteristic and similarity to the computer-generated autocorrelation shown in FIGS. 7 and 8.

Signal Processing

Figure 14:
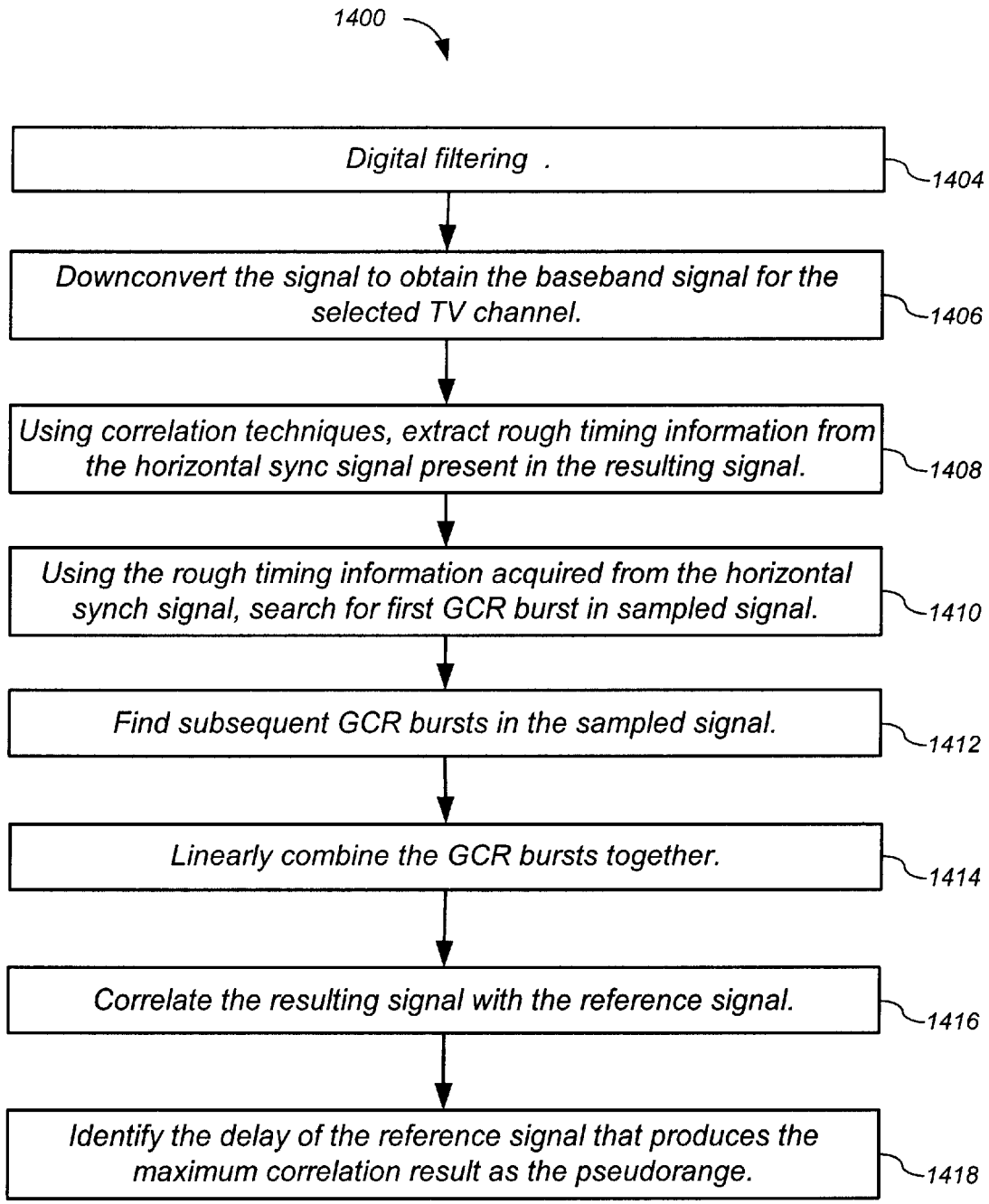
FIG. 14 is a flowchart depicting a process performed by the processor of FIG. 4 in obtaining a pseudorange; from a stored sample of a TV signal including two or more GCR bursts according to one implementation.

FIG. 14 is a flowchart depicting a process 1400 performed by processor 420 of FIG. 4 in obtaining a pseudorange from a stored sample of a TV signal including two or more GCR bursts, according to one implementation. The Appendix in this disclosure includes commented pseudocode further elaborating the details of process 1400. Notice that the technique of storing the television samples and then processing the signal in software is only one implementation of the invention. It will be clear to one skilled in the art after reading this disclosure how the same basic technique can be implemented in hardware.

The sample of the TV signal includes several vertical blanking intervals, each including a GCR burst. If the signal has been down-converted to baseband and lowpass filtered, as illustrated in FIG. 4 and described above then we may skip step 1404 and 1406. However, if the signal has been converted to some intermediate frequency then we may begin at step 1404 in which the signal is further filtered digitally in order to remove the unwanted adjacent channel interference, noise and possibly any narrow-band interference (step 1404) The techniques for filtering out these unwanted disturbances are well known in the art.

Process 1400 downconverts the resulting signal to obtain the baseband signal for the selected TV channel, (step 1406). In one implementation, this is accomplished by first mixing the TV channel signal with in-phase and quadrature mixing signals, and then filtering the results.

In one implementation, process 1400 then extracts rough timing information from the horizontal sync signal present in the resulting signal in order to speed the search for the GCR signal (step 1408). In some implementations, this rough timing information is extracted by correlating the resulting signal with a reference waveform which replicates the horizontal sync signal and determining the peak of the correlated output. Due to the rapid repetition rates of the horizontal sync signal, the extraction of rough timing information from this signal can be achieved with high computational efficiency. One technique for extracting this horizontal sync timing information is disclosed in U.S. Nonprovisional patent application Ser. No. 10/054,302, "Position Location Using Broadcast Analog Television Signals," by Matthew Rabinowitz and James J. Spilker, filed Jan. 22, 2002, the disclosure thereof incorporated by reference herein in its entirety. As mentioned above, the horizontal synch timing is inadequate for accurate position location, and therefore is used only to speed the search for the GCR signal bursts. The search is speeded up since the time separation between the GCR burst and the horizontal sync pulse which directly precedes that GCR signal burst is relatively well known. However, this step (1408) is not necessary.

Process 1400 then searches for a GCR burst, generally starting with the earliest sample and working toward the latest sample (step 1410). In one implementation, process 1400 first determines the size of a search window, or a certain number of samples to search over, in order to find the first GCR burst using the rough timing information extracted from the horizontal sync signal. The size of this search window is determined by such factors as clock uncertainty in the transmitter and receiver, as well as by the accuracy by which initial rough timing can be extracted from the horizontal synch signal. The search window needs to be large enough that it will definitely include the first sample of the next GCR burst. In one implementation, the search window for each horizontal line segment is searched sequentially until the first GCR burst is found. In the preferred embodiment, the search is performed by correlating the reference GCR signal with the sampled data until the correlation result exceeds some energy threshold.

Once the first GCR burst is found, process 1400 then searches the next vertical field for the next GCR burst in the sample (step 1412). In one embodiment, a search window is established for use in searching for the subsequent GCR burst. The search window must be large enough that the first sample of the subsequent GCR burst lies within that window. Note that in the NTSC standard, successive GCR bursts are separated alternately by 262 and 263 horizontal lines. Hence, in one embodiment, once the first GCR burst is found, the $262^{nd}$ horizontal line that follows that burst is searched for the next GCR burst. If the next GCR burst is not found at this line, then the $263^{rd}$ line is searched for the GCR burst. Process 1400 locates the remaining GCR bursts in a similar manner.

Process 1400 then linearly combines the GCR bursts (step 1414). Note that this linear combination takes into account the sign flips of the GCR bursts over the 8 frame superframe so that the energy of all the GCR bursts used is constructively added. The resulting signal is then correlated with the reference signal using a varying delay term (step 1416). Process 1400 identifies the delay producing the maximum correlation result as the pseudorange (step 1418). Of course, there are many other approaches to determining the pseudorange which would be apparent to one skilled in the art after reading this disclosure. For example, a hardware approach using a time-gated delay locked loop might be employed and the pseudorange would be generated by sampling the state of the delay-locked loop.

Noncoherent or Coherent Correlator

Figure 15:
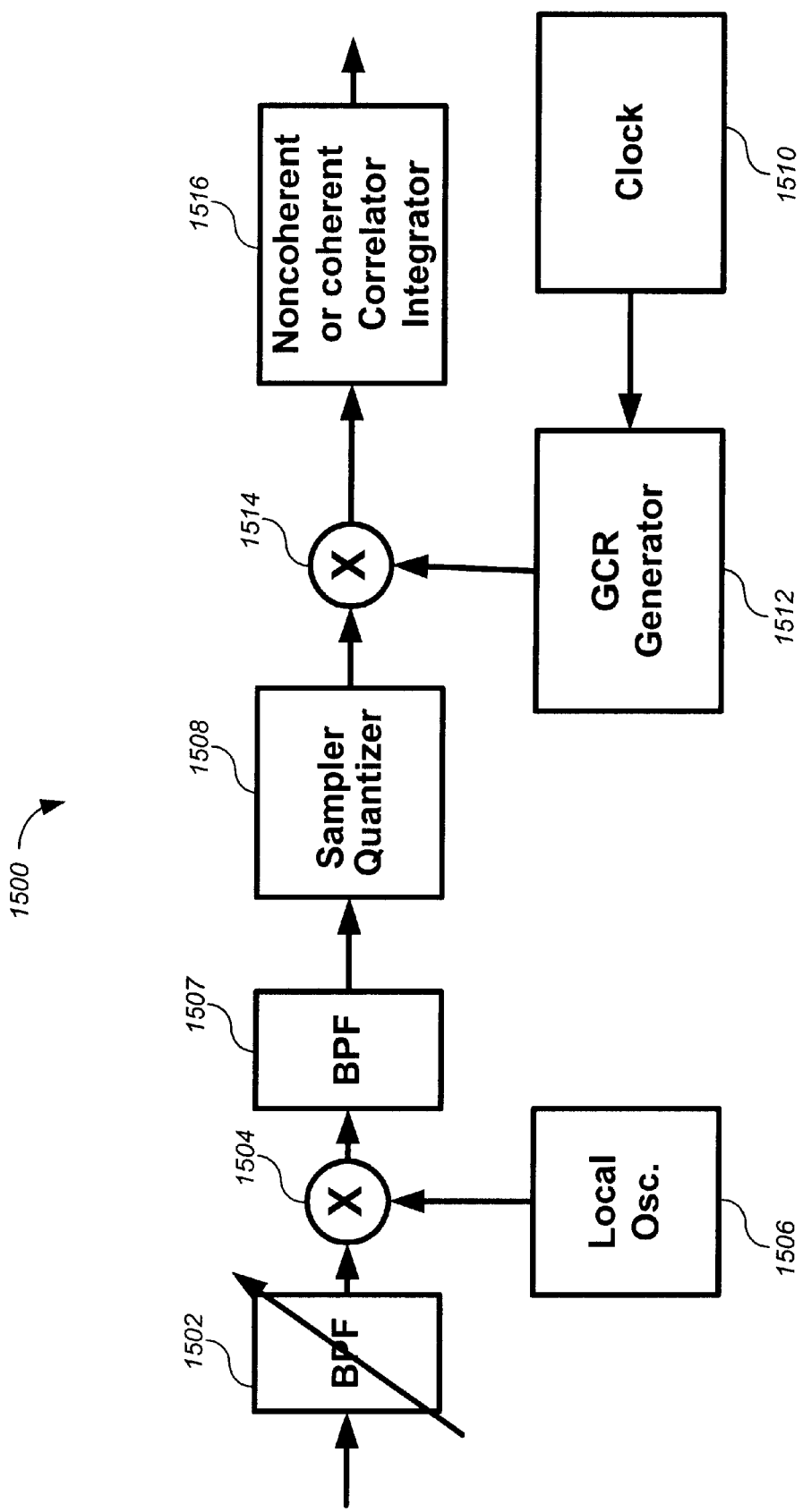
FIG. 15 shows a simplified diagram of a correlator that can be used in either a coherent or noncoherent operation.

FIG. 15 shows a simplified diagram of a correlator 1500 that can be used in either a coherent or noncoherent operation. The received signal generally will be received, sampled and quantized and processed either in real time or in an off-line processor operating on the stored data.

The RF NTSC TV signal is first filtered by a tunable bandpass filter 1502, then down-converted by mixer 1504 and local oscillator 1506, filtered by a bandpass filter 1507, and sampled and quantized by sampler/quantizer 1508. A clock 1510 drives a GCR generator 1512 that generates a time-delayed replica of the GCR signal. Mixer 1514 combines the replica with the quantized signal. The result is passed to a correlator integrator 1516 that can be coherent or non-coherent. Correlator integrator 1516 will generate a large output when the time-delayed replica of the GCR signal, or reference signal, aligns in time with the incident GCR signal. In one embodiment, the time-delay which generates the highest largest output from the correlator integrator is the pseudorange. Alternatively, the signal can be processed by in-phase/quadrature sampling and quantizing. A single GCR burst signal can be processed; or if more processing gain is required one or more superframes of 8 frames each can be employed.

Correlation Techniques

Figure 16:
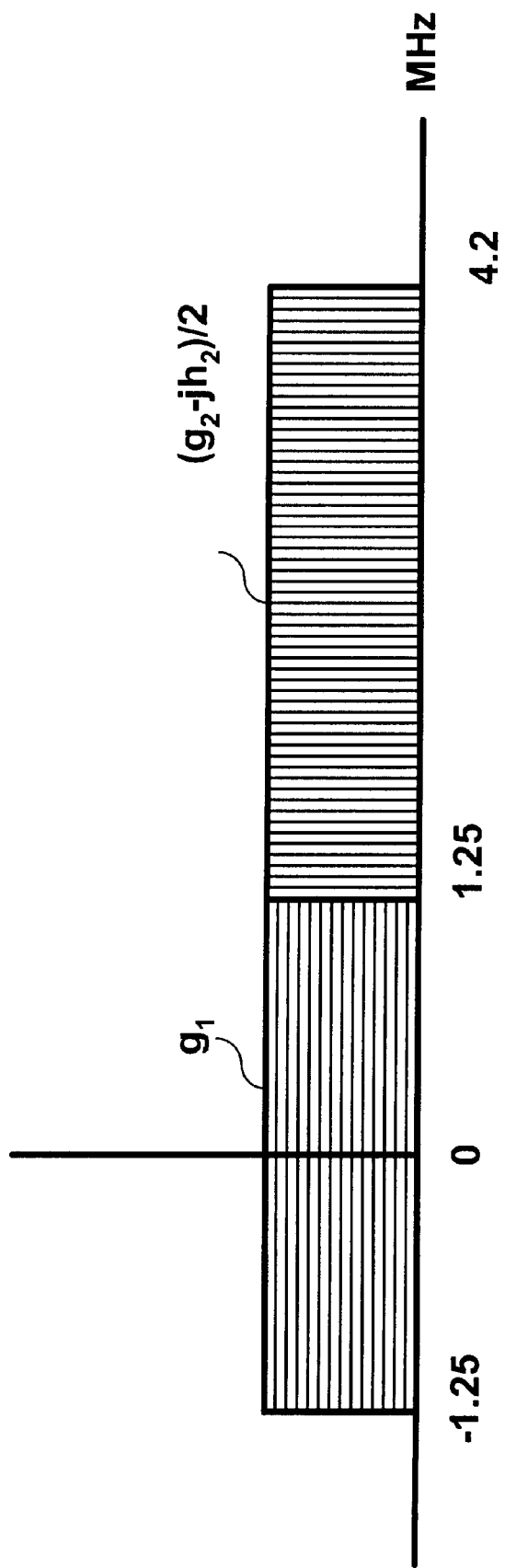
FIG. 16 shows a baseband representation of the GCR signal in the frequency domain.
Figure 17:
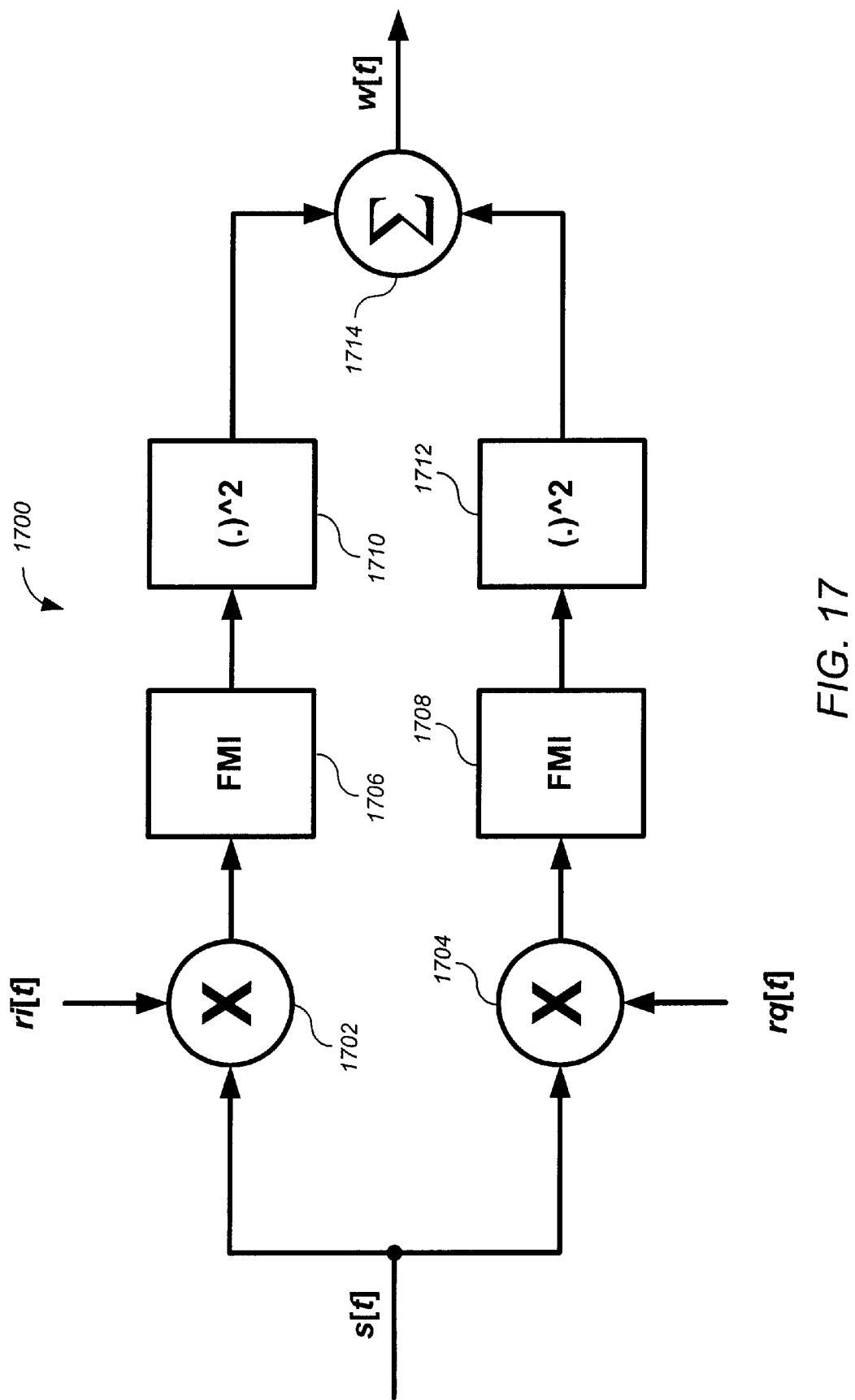
FIG. 17 is a functional block diagram of a cross-correlator according to one implementation.

Many different correlation techniques can be used with the GCR signal and various reference signals to obtain pseudoranges for position location. Some of these implementations are now discussed. Of course, still other correlation techniques can be used. These techniques can be used alone or in combination. A baseband representation of the GCR signal in the frequency domain is shown in FIG. 16. The GCR signal at some frequency offset ω and some phase offset φ can be represented as $$s[t] = g_1[t]\cos[\omega t + \phi] + \frac{1}{2}(g_2[t]\cos[\omega t + \phi] + h_2[t]\sin[\omega t + \phi]) \quad (9)$$

where $h_2$ represents the Hilbert transform of $g_2$. FIG. 17 is a functional block diagram of a cross-correlator 1700 according to one implementation. Mixers 1702 and 1704 combine s[t] with reference signals ri[t] and rq[t], respectively, where $$ri[t] = \left(g_1[t] + \frac{g_2[t]}{2}\right)\cos\omega t - \frac{h_2[t]}{2}\sin\omega t \quad (10)$$

$$rq[t] = \left(g_1[t] + \frac{g_2[t]}{2}\right)\sin\omega t - \frac{h_2[t]}{2}\cos\omega t \quad (11)$$

producing in-phase and quadrature components, respectively. Finite memory integrators (FMI) 1706 and 1708 integrate the in-phase and quadrature components, respectively, over the width of the GCR signal, which is approximately 35.5 microseconds in duration. The resulting signals are processed by square-law devices 1710 and 1712, respectively. The resulting signals are summed by summer 1714 producing a correlation result w[t]. Note that by successively shifting the reference signal in time by some delay τ relative to the incident signal, and producing a correlation result for each time delay τ of the reference signal, we generate a complete correlation function.

Figure 18:
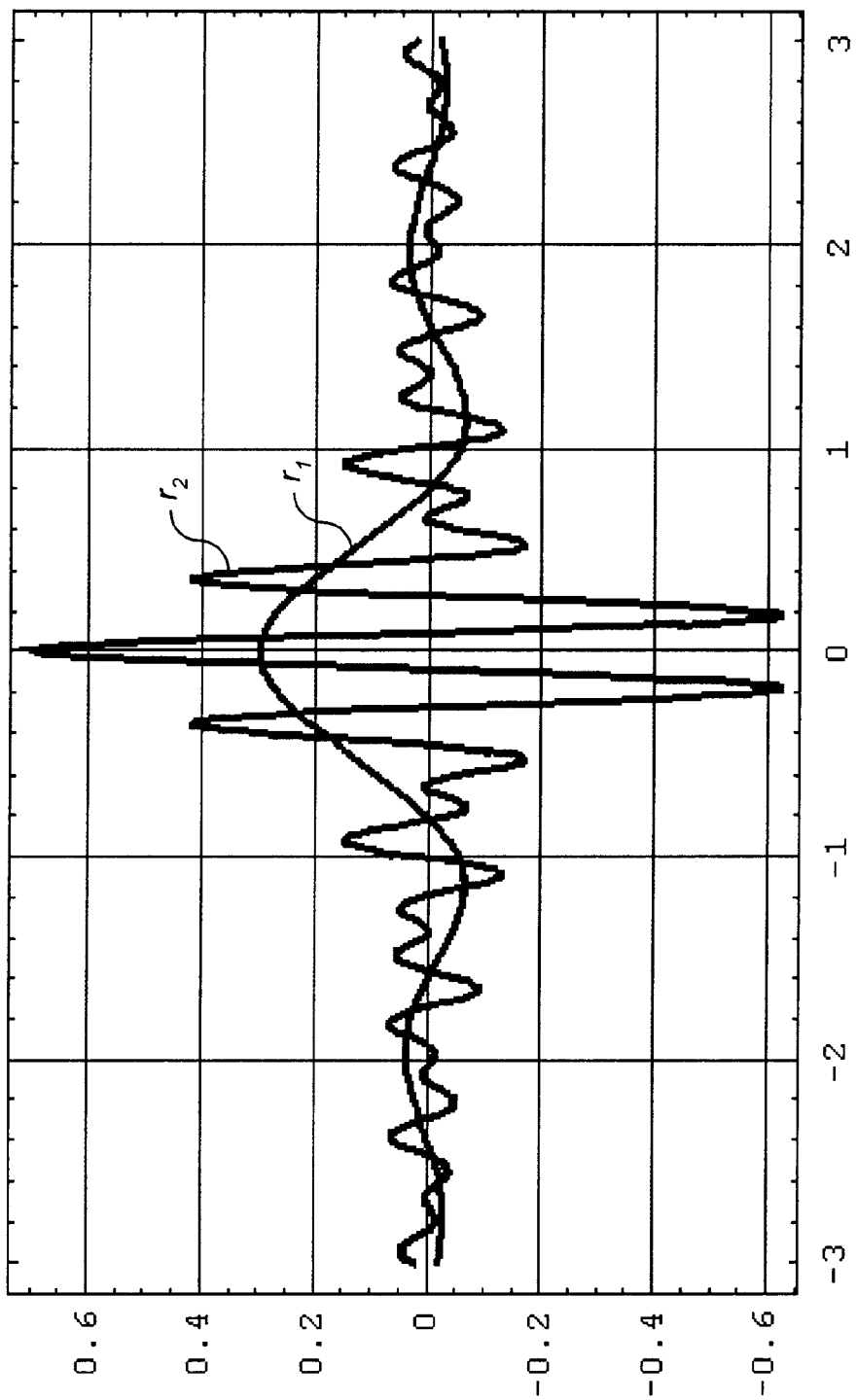
FIG. 18 shows the autocorrelation functions for the cross-correlator of FIG. 17.
Figure 19:
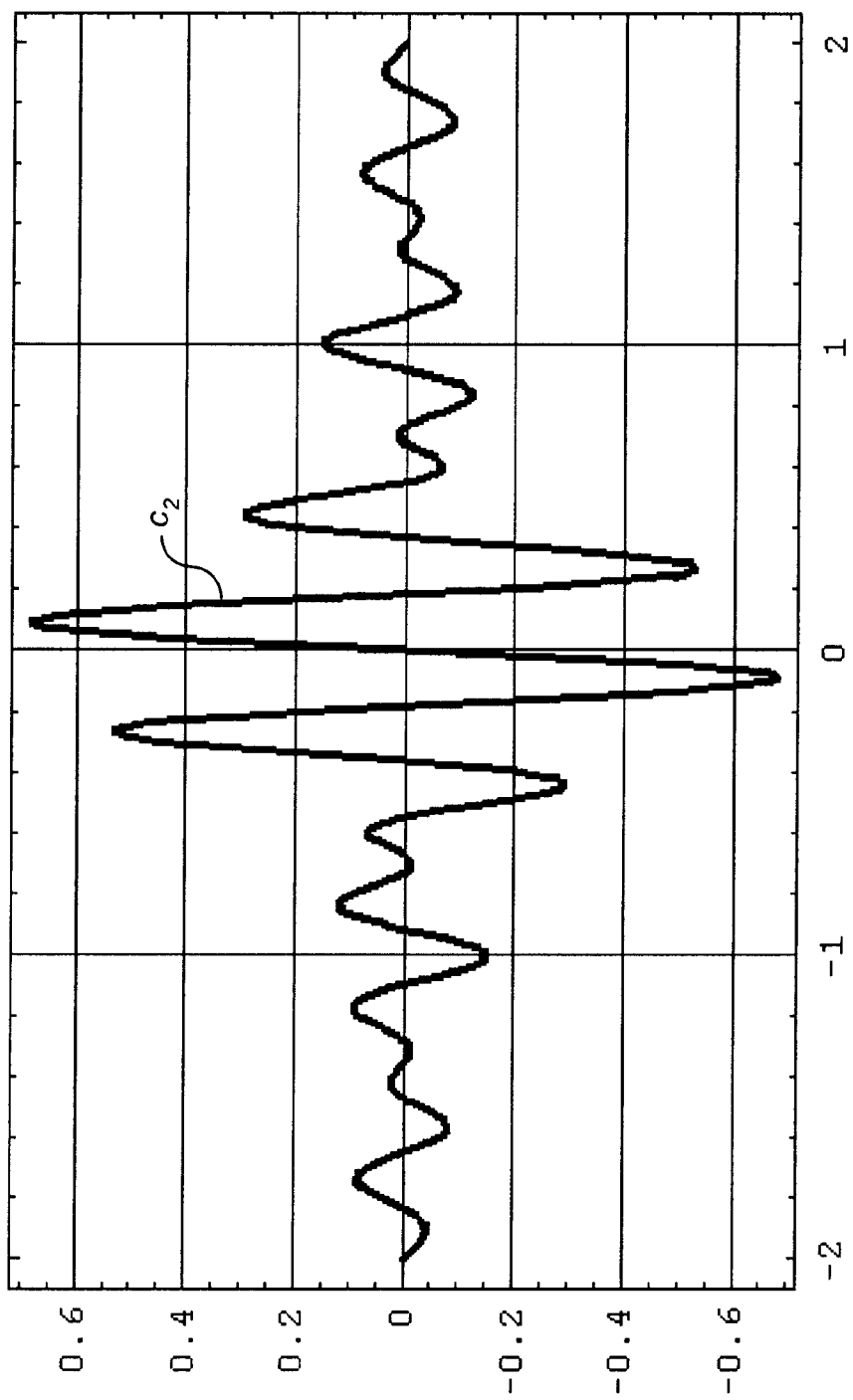
FIG. 19 shows the cross-correlation result for the cross-correlator of FIG. 17.

FIG. 18 shows the autocorrelation functions $$r_1 = g_1 * g_1 \tag{12}$$

and $$r_2 = g_2 * g_2 \tag{13}$$

recognizing that the $g_2$ component is a bandpass signal with a center frequency of 2.725 MHz and a bandwidth of 2.95 MHz. FIG. 19 shows the cross-correlation result $$c_2 = g_2 * h_2 \tag{14}$$

Figure 20:
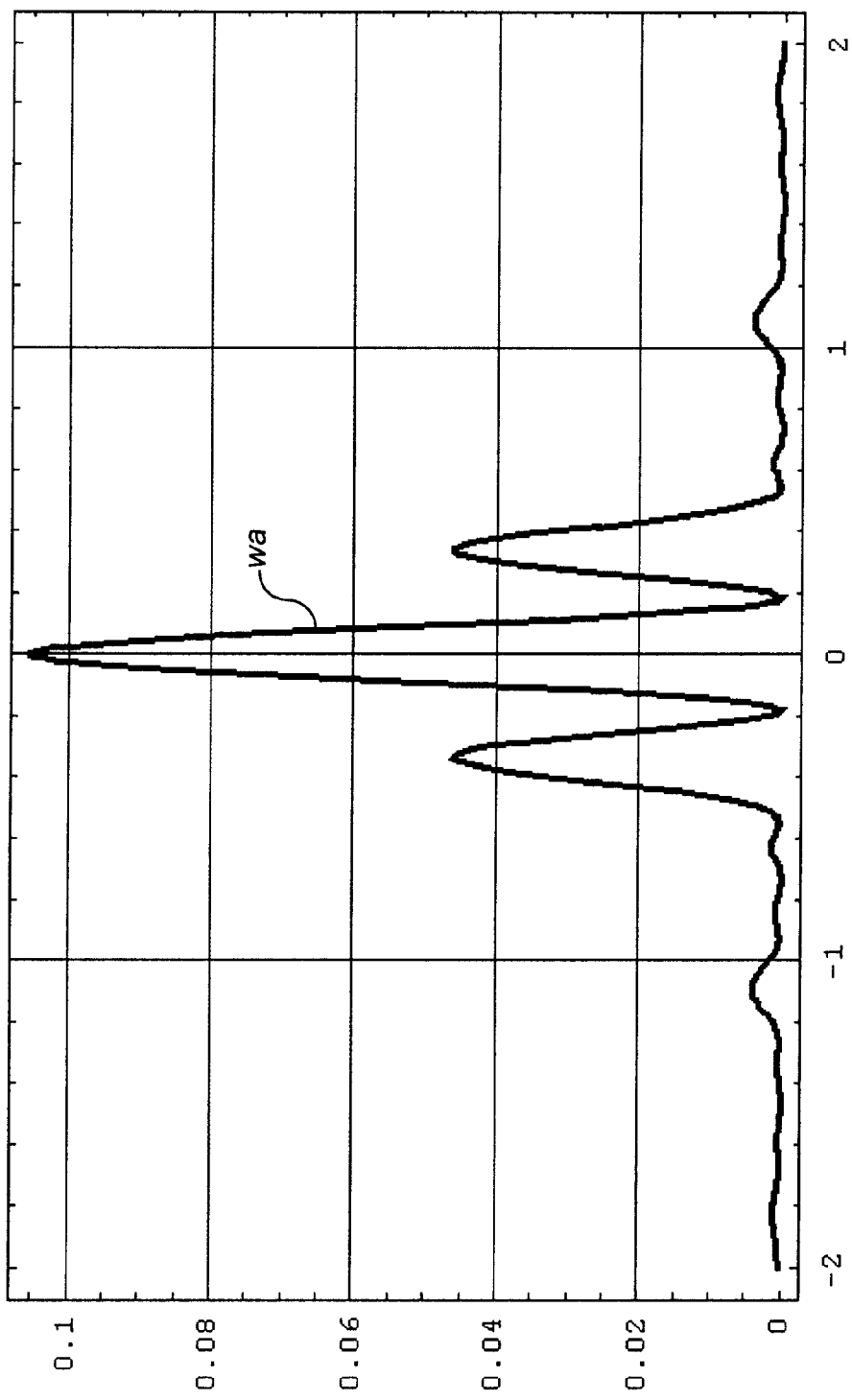
FIG. 20 shows the cross-correlation result of the full GCR signal with a full waveform reference signal.

FIG. 20 shows the cross-correlation result wa between the full GCR signal with a full waveform reference signal $$r[t] = g_1[t+\tau]\cos[\omega t] + \frac{1}{2}(g_2[t+\tau]\cos[\omega t] + h_2[t+\tau]\sin[\omega t]) \tag{15}$$

where τ is the delay error and the cross-correlation result wa is given by $$wa[t] = \frac{1}{16}(4r_1[\tau]^2 + r_2[\tau]^2 + c_2[\tau]^2 + 4r_1[\tau]r_2[\tau]) \tag{16}$$

This expression would have no major sidelobes except for the presence of the last term.

One implementation separately correlates the GCR signal with the $g_1$ and $g_2$ terms, and then sums the two correlation results. Each of the results have the minor sidelobes of the sin x/x functions. The GCR signal is correlated with the $g_1$ cosine and sine terms to obtain $$wg_1[\tau] = \frac{r_1[\tau]^2}{2} \tag{17}$$

The GCR signal is separately correlated with the $g_2$ cosine and sine terms to obtain $$wg_2[\tau] = \frac{r_1[\tau]^2 + c_2[\tau]^2}{16} \tag{18}$$

Figure 21:
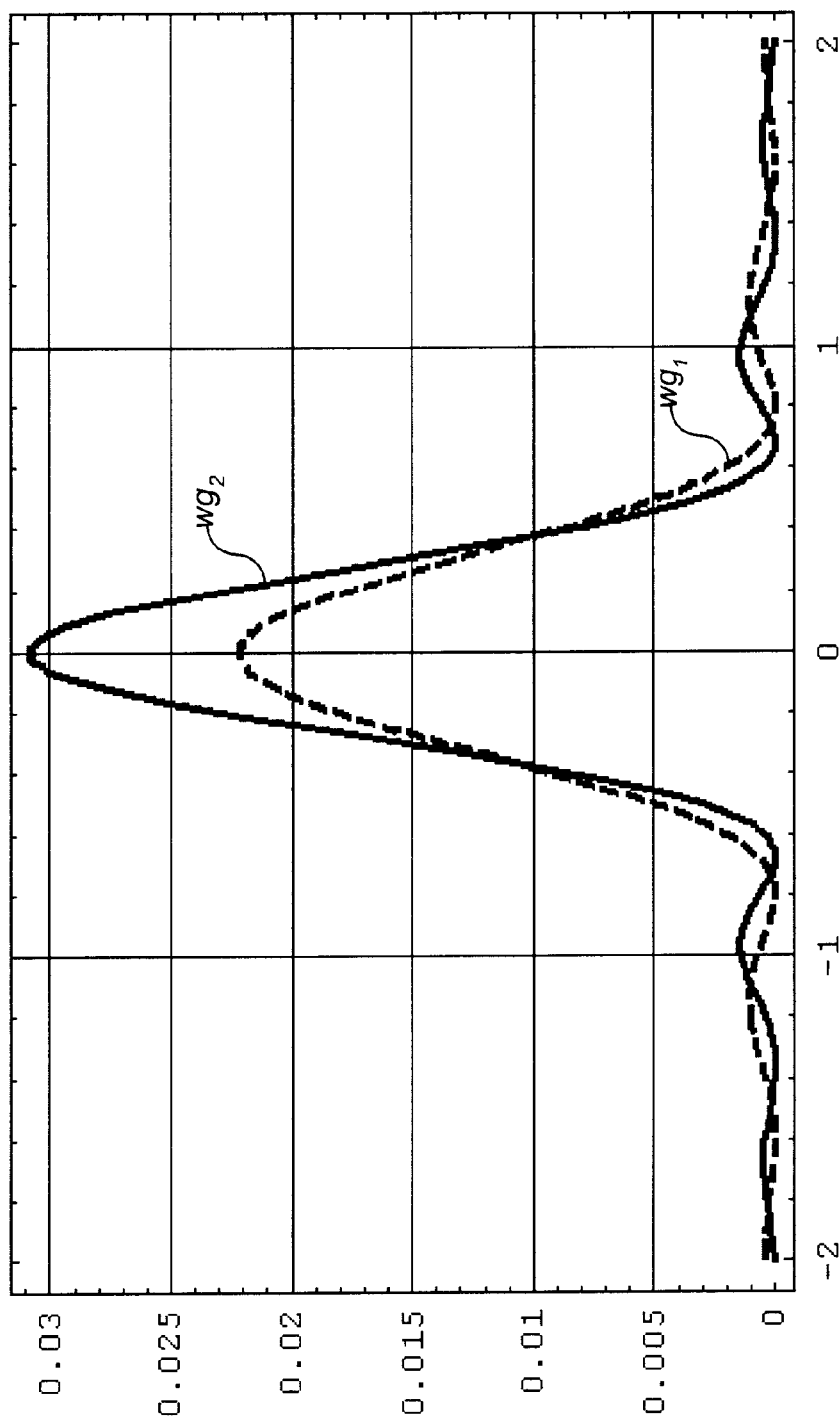
FIG. 21 shows the noncoherent outputs of one implementation.
Figure 22:
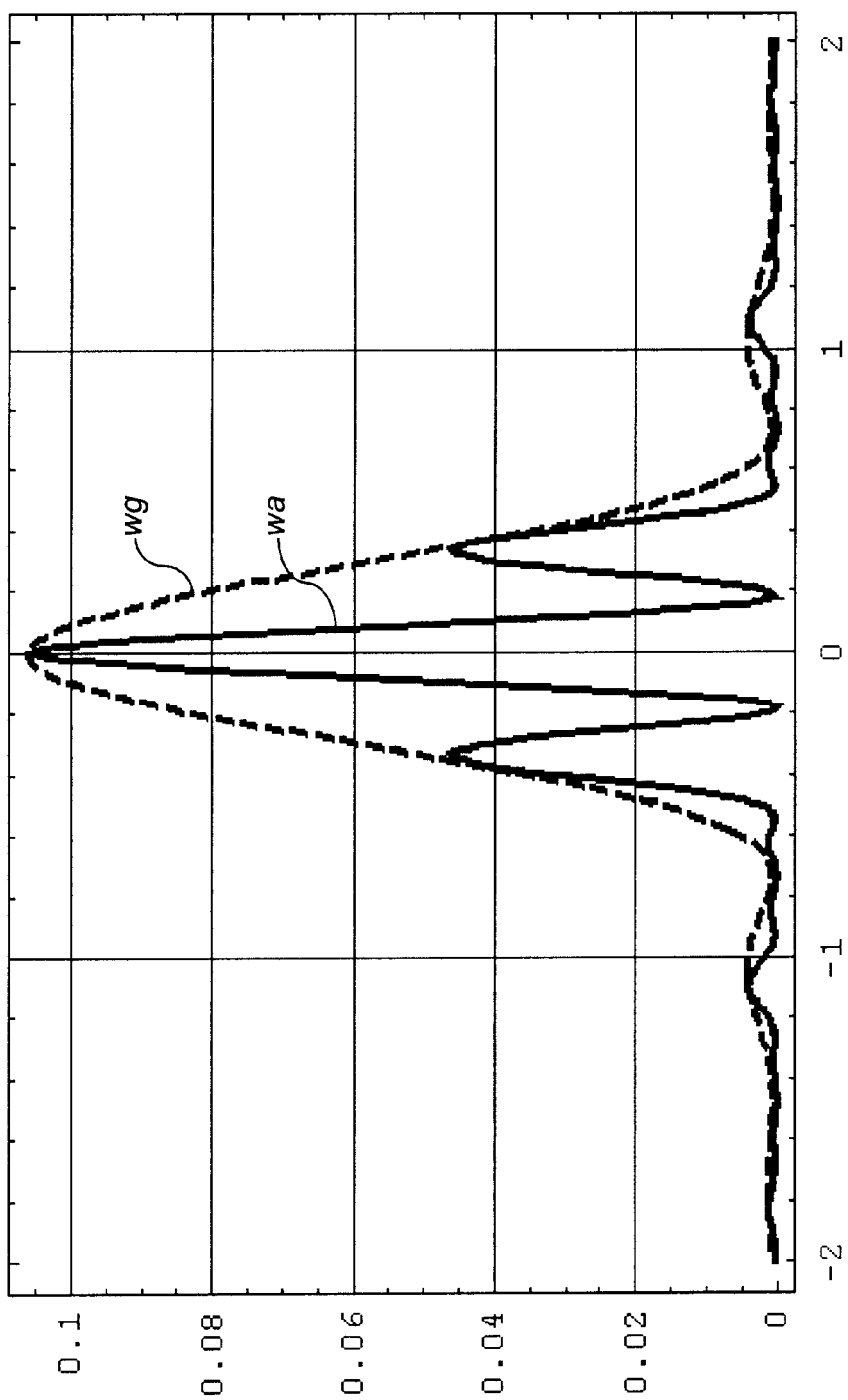
FIG. 22 compares the sum of the noncoherent outputs of FIG. 21 with the total correlation result of FIG. 20, where wa and wg have been normalized to the same peak value.

FIG. 21 shows the noncoherent outputs $wg_1$ and $wg_2$. FIG. 22 compares the sum $$wg = wg_1 + wg_2 \tag{19}$$

with the total correlation result wa discussed above, where wa and wg have been normalized to the same peak value. Notice that although the separate sum wg has lower sidelobes, it is wider and encompasses the two sidelobe peaks of the total correlation result wa.

Figure 23:
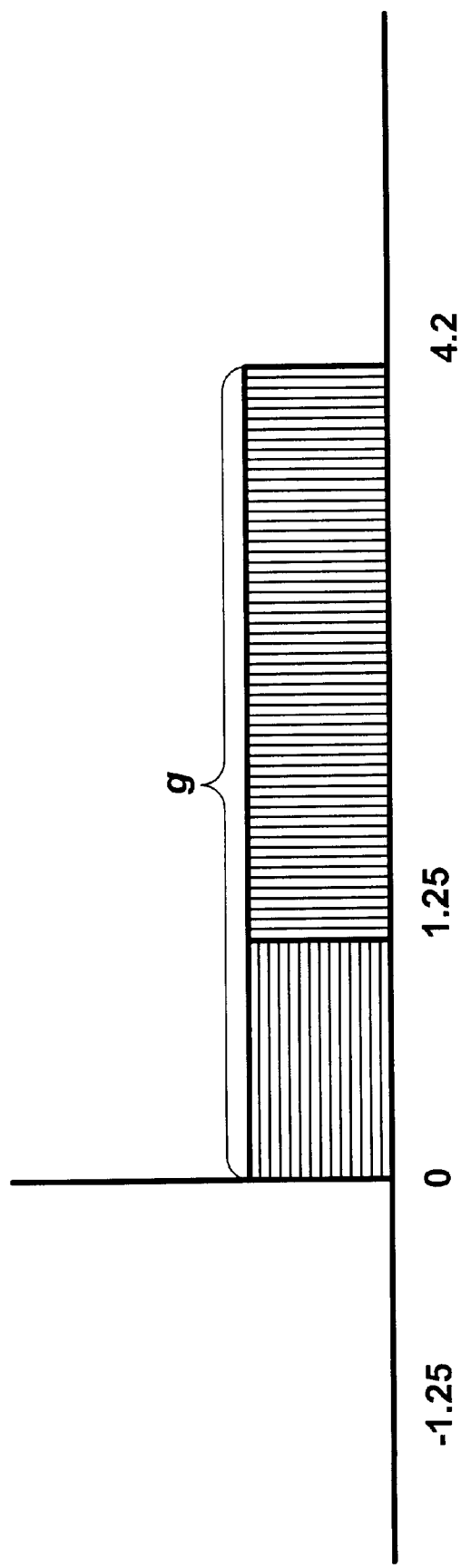
FIG. 23 shows the result when the received GCR signal is filtered to remove the lower sideband of the $g_1$ signal.

In one implementation, the received GCR signal is filtered to remove the lower sideband of the $g_1$ signal, producing the signal g shown in FIG. 23. The filtered signal with the lower sideband removed can be represented as $$sb[t] = g[t]\cos[\omega t + \phi] + h[t]\sin[\omega t + \phi] \tag{20}$$

where h[t] is the Hilbert transform of g[t]. The noncoherent cross-correlator output for this full bandwidth signal then has the form $$wb[\tau] = \frac{1}{2}(rb[\tau]^2 + cb[\tau]^2) \tag{21}$$

where $$rb[\tau] = \frac{\sin[\pi 4.2\tau]}{\pi 4.2\tau} \tag{22}$$

and $$cb[\tau] = \frac{2}{\pi} \frac{\sin^2[\pi 4.2\tau]}{\pi 4.2\tau} \tag{23}$$

Figure 24:
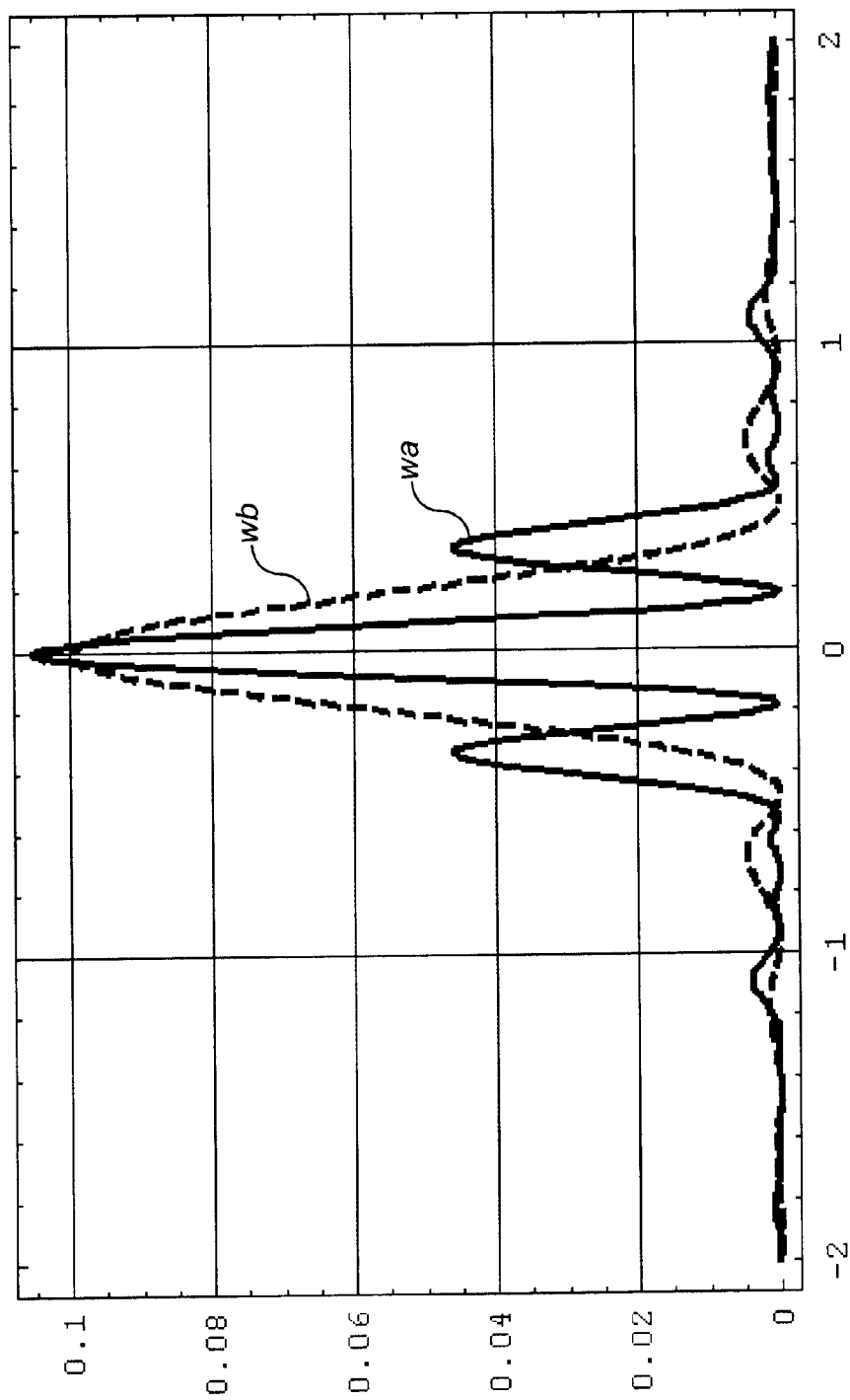
FIG. 24 compares the correlation result using the signal of FIG. 23 with the total correlation result of FIG. 20.

FIG. 24 compares the correlation result wb with the total correlation result wa discussed above. Notice that result wb has the more narrow total correlation peak when the major sidelobes are considered.

Figure 25:
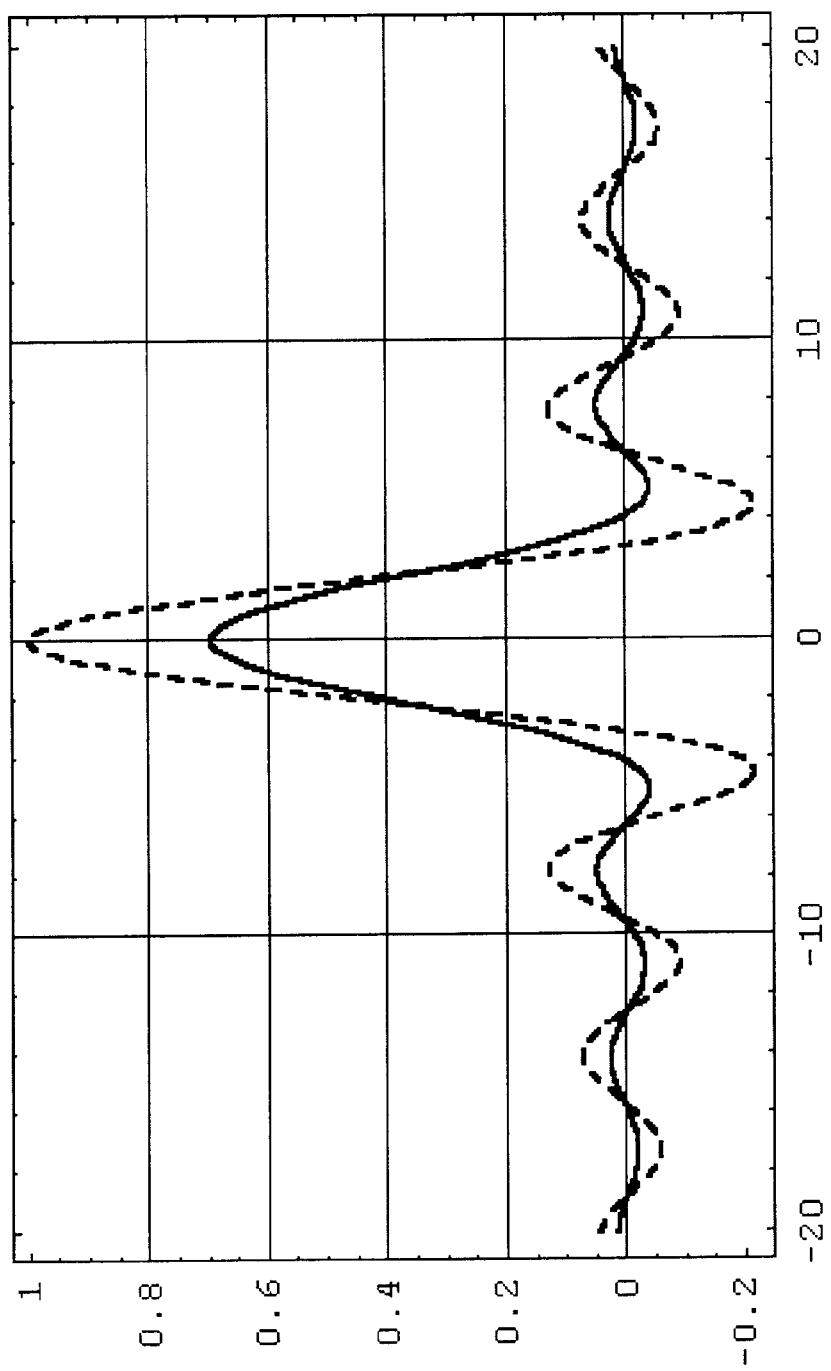
FIG. 25 compares an autocorrelation (shown as a solid line) to the unfiltered rectangular spectrum (shown as a dashed line) for an implementation that further reduces the cross-correlation sidelobes, by shaping the GCR signal spectrum.

One implementation further reduces the cross-correlation sidelobes by shaping the GCR signal spectrum. As discussed above, the GCR signal can be filtered to a cosine-squared spectrum by simply performing a delay and add operation on the signal. Another simple technique is to filter the upper spectral region slightly using a first-order Butterworth filter which produces as 3 dB attenuation at 0.75 of the 4.2 MHz bandwidth of the GCR signal. FIG. 25 compares the resulting autocorrelation (shown as a solid line) to the unfiltered rectangular spectrum (shown as a dashed line). Notice that even a small amount of filtering reduces the spectral sidelobes. However, it also reduces the peak value because of some loss in total GCR power.

Position Location using Other Chirp-type TV Signals

As discussed above, the NTSC Analog TV signal often has a GCR signal that can be used as an excellent means of timing recovery. According to the recommendation of the ITU Radiocommunication assembly which is recorded in document Rec. ITU-R BT.1124-3, there are three different kinds of GCR signal standards, namely A, B, C. Each of these signals is used in different areas of the world, and can be used for location determination according to implementations of the present invention. GCR Signal C is the chirp signal as is used for example by the NTSC in the United States as described above. GCR Signal C may also be used for PAL and SECAM systems. GCR Signal B is a Pseduo-Noise (PN) sequence, and is used for example by the NTSC system in Korea. Note that the autocorrelation function of the PN signal is very narrow and is therefore very good for ranging. One skilled in the art will recognize after reading this disclosure that GCR Signal B can be used in the similar way as GCR Signal C. In one embodiment, the same receiver architectures are used as for the GCR signal A, except that the reference signal is the PN sequence which replicated GCR Signal B.

The GCR Signal C is a bar signal with a rise waveform of a sinc function. This is used extensively for the NTSC system in Japan. In order to remove the effects of the color and luminescence signal elements which differ from one field to another, the GCR bursts are arranged in 8 field sequences. In order to construct a single GCR signal with minimal distortion from interfering-signals, we combine the GCR signals from the eight fields $S_1$ through $S_8$ according to:

$$S_{gcr} = S_1 - S_5 + S_6 - S_2 + S_3 - S_7 + S_8 - S_4 \tag{23}$$

Figure 26:
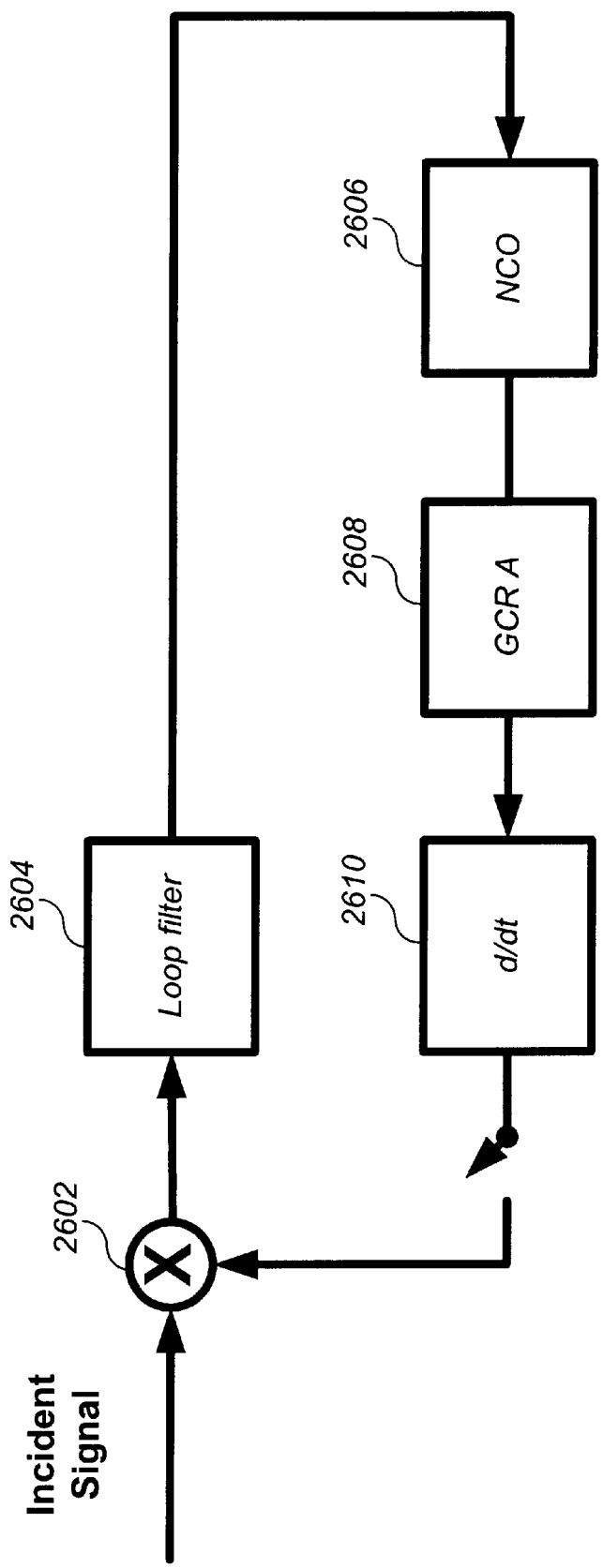
FIG. 26 illustrates one implementation for tracking the GCR Signal A without taking a derivative of the measured signal.

Of course, one could combine many sets of 8 field sequences in order to increase the processing gain. The resulting signal $S_{gcr}$ does not have a narrow autocorrelation characteristic; however it's derivative has a narrow autocorrelation characteristic which can be used for precise ranging. Consequently, one skilled in the relevant art will recognize that a similar technique can be used as that applied to GCR signals A and B. In one embodiment, the derivative of the filtered GCR Signal A is computed before correlation, and the correlation reference is an idealized replica of the derivative of GCR Signal A. Since a noise penalty occurs when a sampled signal is differentiated, another approach is to use only the derivative of the reference GCR signal. For example, FIG. 26 illustrates one implementation for tracking the GCR Signal A without taking a derivative of the measured signal. FIG. 26 illustrates the optimal time-gated delay-locked tracking loop. The incident signal is mixed by a mixer 2602 with a derivative of the GCR Signal A produced by a differentiator 2610. The combined signal is input to a loop tracking filter 2604, the output of which drives a Numerically Controlled Oscillator (NCO) 2606 that in turn drives a GCR Signal A reference generator 2608. Notice that the delay-locked loop is time-gated so that we are only mixing of the two incident and reference signals at the relevant time when the GCR burst occurs on the incident signal. Using this time-gated architecture, a receiver can hop from one TV channel to another, with a separate control loop tracking each of those channels simultaneously. The time-gated architecture allows for substantial power savings. Once the initial timing on the GCR burst for each relevant TV channel has been acquired, the receiver can be turned on in short bursts only to capture the GCR signal energy. It will be clear to one skilled in the art how this technique can be applied to all the GCR standards, as well as to the other low duty factor synchronization signals.

Figure 27:
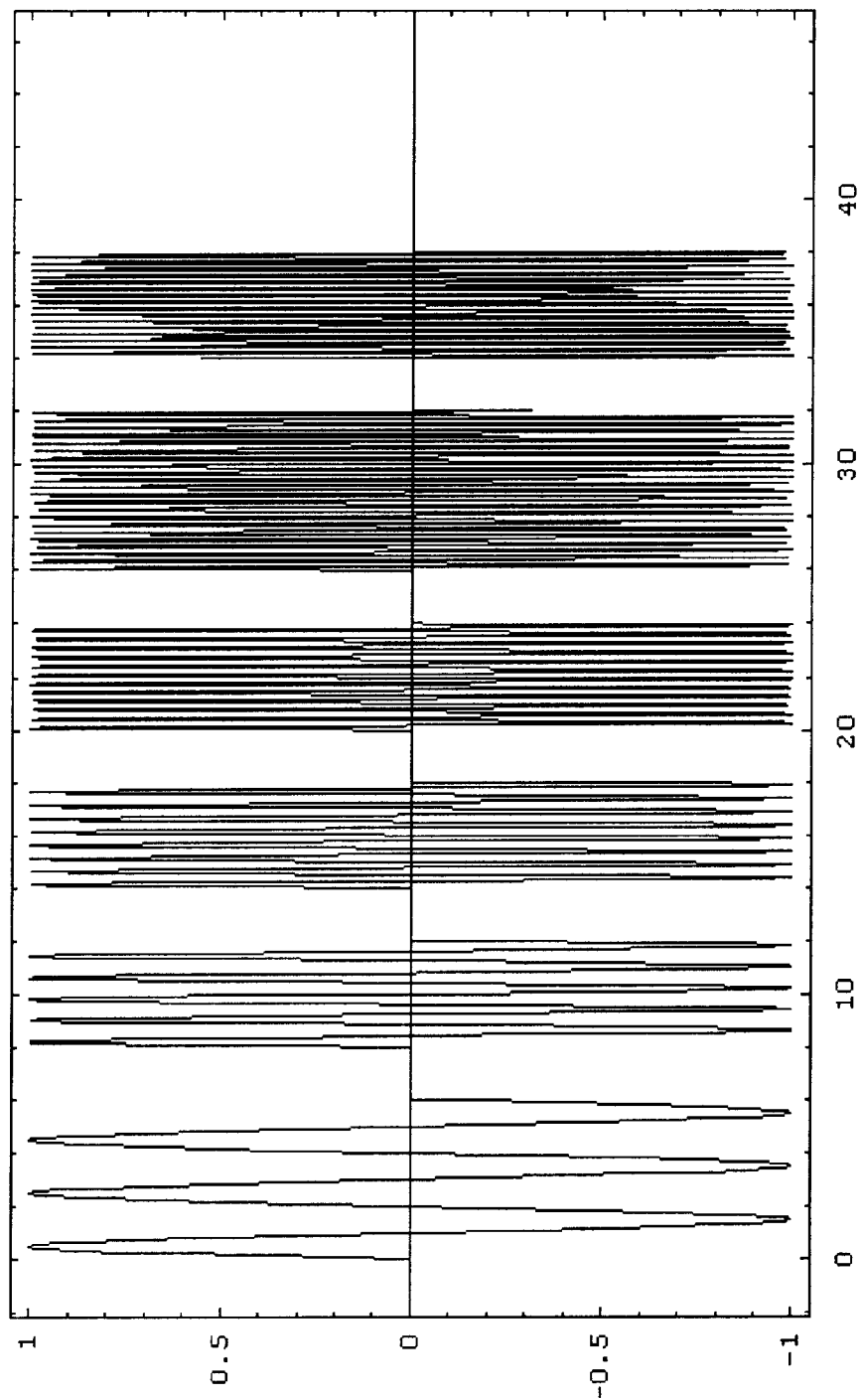
FIG. 27 shows an example of the NTSC vertical interval test signal waveform excluding some of its pulses.

In addition to the GCR signal there is another TV signal useful for timing that consists of a sequence of increasing tones. That signal is the vertical interval test signal (VITS) described by the NTSC specification Signal Transmission Standards 21.55. The VITS waveform can be transmitted in line 17, field 1 of the vertical blanking interval. FIG. 27 shows an example of the VITS waveform excluding some of its pulses. The time scale is in microseconds. The staircase and steps in the VITS waveform are not shown.

Figure 28:
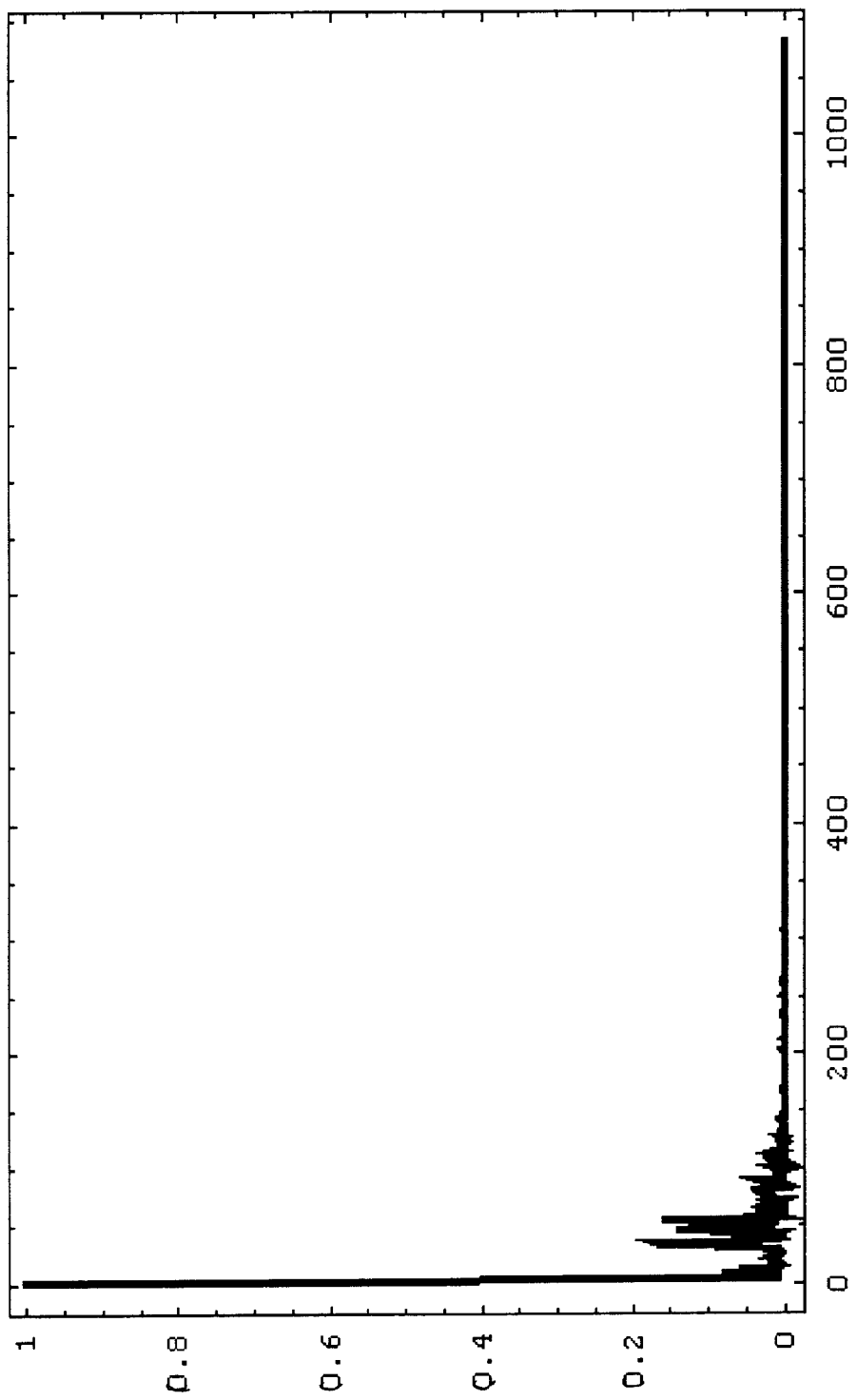
FIG. 28 shows the squared autocorrelation function when the VITS signal is sampled at 27 MHz and considered it to be zero outside this time interval.
Figure 29:
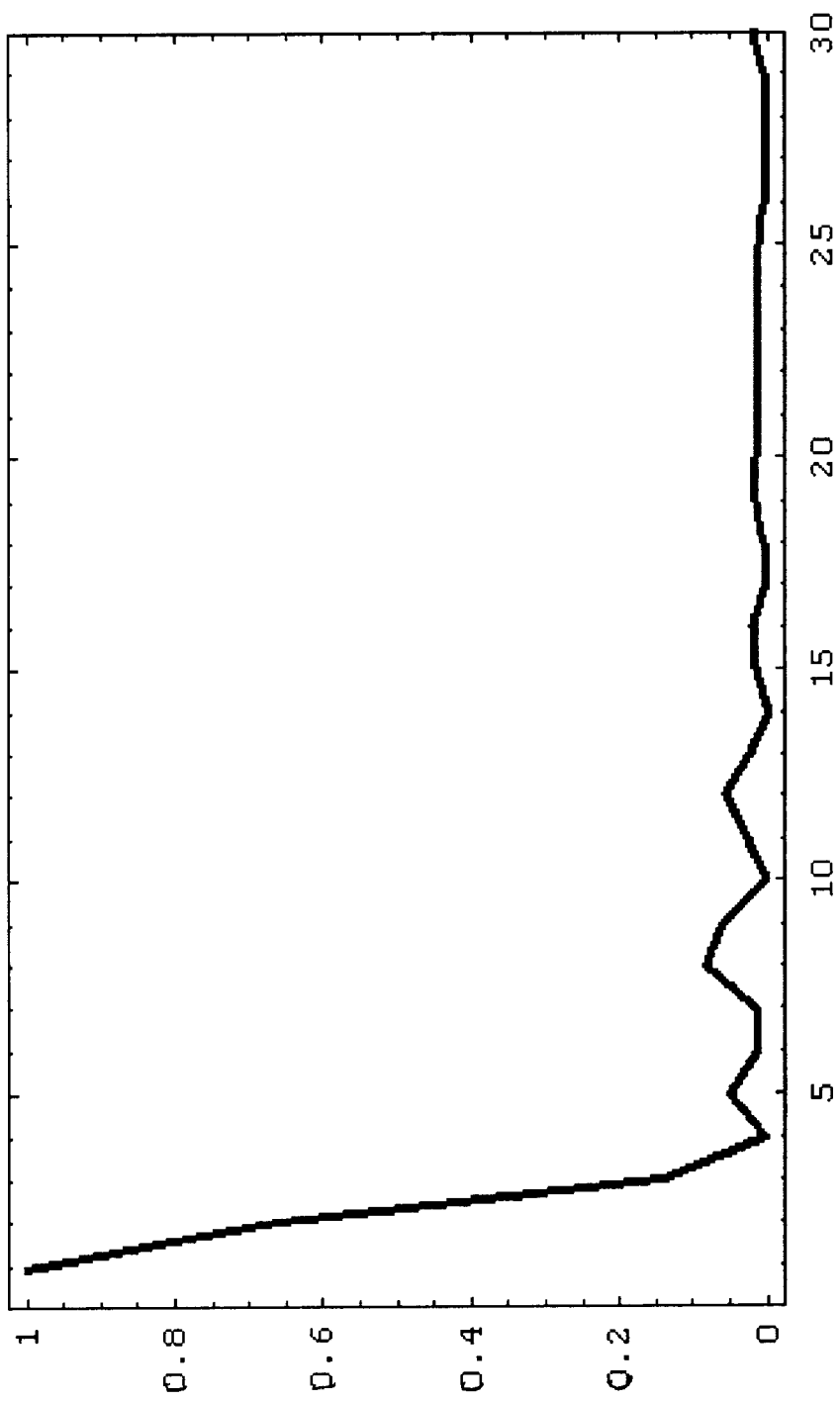
FIG. 29 shows the portion of FIG. 28 over the range of 0 to 30 samples for a sample rate of 27 MHz.

In the FCC version of this waveform the frequencies are in succession 0.5. 1.25, 2.0, 3.0, 3.58, 4.1 MHz. The peak-to-peak amplitude is roughly 60 IRE units. FIG. 28 shows the squared autocorrelation function when the VITS signal is sampled at 27 MHz and considered it to be zero outside this time interval. The time scale is $\frac{1}{27}$ microsecond. Thus sample 27 corresponds to 1 microsecond. FIG. 29 shows the portion of FIG. 28 over the range of 0 to 30 samples for a sample rate of 27 MHz. The peak is a sample 1 not zero. For this 28 MHz sample rate, one sample offset corresponds to a time offset in free space of approximately 37 feet. The width of the squared autocorrelation one-sided is approximately 2 samples or roughly 60 feet. Thus the VITS signal is a useful augmentation or replacement of the GCR signal for precise timing. In addition, the inventors contemplate that other chirp-type signals can be used with the invention for position location.

A number of implementations of the invention have been described. Nevertheless, it will be understood that various modifications can be made without departing from the spirit and scope of the invention. For example, other chirp-type signals can be used in place of the GCR signal for position location. The pseudoranges for position location can include not only pseudoranges generated based on the chirp-type signals present in analog television broadcasts, but also pseudoranges derived from digital television (DTV) broadcast signals. Techniques for generating pseudoranges based on DTV broadcast signals are disclosed in U.S. Non-provisional patent application Ser. No. 09/887,158, "Position Location using Broadcast Digital Television Signals," by Matthew Rabinowitz and James J. Spilker, filed Jun. 21, 2001, the disclosure thereof incorporated by reference herein in its entirety. The GCR signal can be tracked using time-gated delay lock loop techniques such as those disclosed in U.S. Non-provisional patent application Ser. No. 10/054,262, "Time-Gated Delay Lock Loop Tracking Of Digital Television Signals," by Matthew Rabinowitz and James J. Spilker, filed Jan. 22, 2002, the disclosure thereof incorporated by reference herein in its entirety. Accordingly, other implementations are within the scope of the following claims.

APPENDIX

```
% $Id: $
%
% $Revision: $
%
% $LO9: $
%
% Author: Matt Rabinowitz
%
% This file processes an analog signal to prodouce one horizontal
% segments worth of data.
%
% Inputs
%
% cor_type          - 1 x 1,        type of correlation to be performed
%                                   1 - hor_synch
%                                   2 - hor_synch_deriv
%                                   3 - gcr_burst
%                                   4 - chrominance burst
% conversion_type   - 1 x 1,        type of downcoversion to be performed
%                                   1 - noncoherent downconversion
%                                   2 - coherent downconversion
% sig_par           - 4 x 1,        parameters which characterise the reference signal
%                                   1 - number of samples of the assumed signal rise
times
%                                   2 - index af the rising edge of the hor synch
```

APPENDIX-continued

```
%                                   3 - index of the falling edge of the hor synch
%                                   4 - index of the falling edge of the blanking pulse
% rate_offset      - 1 x 1,         the offset of the transmitter clock
% rate_uncertainty - 1 x 1,         the 1-sigma uncertainty of the transmitter clk
% s                - sig_len x 1, the actual sampled signal data
%
% Outputs
%
% cor_seg          - cor_len x 1,   correlation segment
% sig_par          - 4 x 1,         parameters which characterise the reference signal
%                                   1 - number of samples of the assumed signal rise
times
%                                   2 - index of the rising edge of the hor synch
%                                   3 - index of the falling edge of the hor synch
%                                   4 - index of the falling edge of the blanking pulse
% start_ind        - index at which to start searching for peak
% dropped_ind      - index up to which data was dropped in generating output
%
% Date: 11/13/01
% Author: Matthew Rabinowitz
function [cor_seg, sig_par, start_ind, dropped_ind] =
analog_correlator_gen(cor_type,conversion_type,sig_par, rate_offset,
rate_uncertainty, s)
% Constants
matlab_init;
% Parameters
f_s = 20e6;                                   % sampling rate of signals
hor_len = f_s/f_hor_synch;                    % length of the horizontal segment
f_up_1 = 7e6/(f_s/2);                         % upper freq for bandpass filter
f_lo_1 = 1e6/(f_s/2);                         % lower freq for bandpass filter
[n_1, d_1] = butter(3, [f_lo_1 f_up_1]);      % parameters for first
bandpass filter
f_lo_2 = (1e6+(6e6-f_aud))/(f_s/2) - .02;     % lower freq for bandstop filter
f_up_2 = (1e6+(6e6-f_aud))/(f_s/2) + .02;     % upper freq for bandstop filter
[n_2, d_2] = butter(3, [f_lo_2 f_up_2], 'stop');  % parameters for bandstop
filter
n_3 = conv(n_1, n_2);        % numerator for bandpass filtering and removing audio
d_3 = conv(d_1, d_2);        % denominator for bandpass filtering and removing audio
f_mix = 7e6-f_lum;           % approximate mixing signal used for non-coherent
conversion
f_up_3 = 6e6-f_lum;          % frequency of post-mixing lowpass filter
[n_4,d_4] = butter(3, f_up_3/(f_s/2));        % parameters for lowpass filter
after mixing
synch_len = synch_pulse*f_s;                  % length of synch pulse (approx)
synch_ref = zeros(floor(hor_len),1);          % reference signal for horizontal
synch
synch_ref(1:synch_len)=ones(synch_len,1);
samples_rise = 3;            % default number of samples used for correlation
load gcr_chirp;                               % loading the gcr_chirp_signal
gcr_len = length(gcr_chirp);
hor_synch_mag_frac = 0.9;                     % fraction of the magnitude of the synch
peak
time_from_hor_synch = 1.6e-5;                 % time from synch pulse rising edge to
gcr_chirp;
hor_synch_precision = .25e-6;                 % precision for timing from hor_synch
protection_interval = 4e-6;                   % protection interval for generating
correlation
% Setting up variables
t_len = length(s);
t = [0:t_len-1]'/f_s;
sig_par = zeros(4,1);
start_ind = 1;
% bandpass filtering the signal and removing audio signal
s_f_1 = filter(n_3, d_3, s)
% downconverting the signal
s_com_i = s_f_1.*cos(2*pi*f_mix*t);
s_com_q = s_f_1.*sin(2*pi*f_mix*t);
s_f_i = filter(n_4, d_4, s_com_i);
s_f_q = filter(n_4, d_4, s_com_q);
% generating the index for combining even and odd horizontal segments
num_hor = floor(t_len.*f_hor_synch/f_s);
ind = [];
for m = 1:num_hor
    ind = [ind; floor((m-1)*hor_len+1)];
end
ind1 = ind(1:2 length(ind));
ind2 = ind(2:2 length(ind));
% creating combinined segments
sig = s_f_i.^2 + s_f_q.^2;
```

APPENDIX-continued

```
hor_store_1 = zeros(floor(hor_len),1);
hor_store_2 = zeros(floor(hor_len),1);
for n = 1,:floor(hor_len)
    hor_store_1(n) = sum(sig(indi+n-1))/length(ind1);
    hor_store_2(n) = sum(sig(ind2+n-1))/length(ind2);
end
% creating a segment correlation
hor_sum = hor_store_1 + hor_store_2;
synch_corr = zeros (floor(hor_len),1);
for loop = 1:hor_len
    synch_corr(loop) = synch_ref(floor(hor_len)-
loop+2:floor(hor_len)) '*hor_sum(1:loop-1)+. . .
        synch_ref(1:floor(hor_len) -loop+1)'*hor_sum(loop:floor(hor_len));
end
% extracting timing from horizontal synch
[synch_cor_max, ind_synch] = max(synch_corr);
threshold = hor_synch_mag_frac*synch_cor_max;
ind = ind_synch;
while (1)
    if (synch_corr(ind) < threshold)
        synch_corr_cross = ind+(threshold-synch_corr(ind))/(synch_corr(ind+1) -
synch_corr(ind));
        break;
    end
    ind = ind-1;
end
% returning results if just want horizontal synch
if (cor_type = = 1)
    cor_seg = synch_corr;
    start_ind = ind_synch - synch_len;
    return;
end
if (cor_type = = 2)
    ave_dur = 1e-6;                      % averaging interval to compute signal
amplitude
    % check if we have parameters of the differential signal
    if (sig_par(1) = = 0)
        % finding average magnitude of various sections of the horizontal segment
        % average magnitude of the synch pulse
        ind_synch_ave = ind_synch+[1:synch_len-2]';
        synch_ave_mag = mean( hor_sum(ind_synch_ave) );
        % average magnitude of the back porch
        ind_porch_ave = ind_synch + synch_len + (delta_synch + slope_dur +
delta_slope)*f_s + [1:(back_porch-delta_back)*f_s]'-1;
        porch_ave_mag = mean( hor_sum(ind-porch_ave) );
        % find the average magnitude of the area just at the back of pulse
        ave_len = floor(ave_dur*f_s);
        ind_back_ave = ind_synch+synch_len+(delta_synch + back_porch + delta_back +
slope_dur + delta_slope)*f_s + [1:ave_len]';
        back_ave_mag = mean( hor_sum(ind_back_ave);
        % find the average magnitude of the area just at the front of pulse
        ind_front_ave = ind_synch - ( front_porch + delta_front + slope_dur +
delta_slope)*f_s - [ave_len:-1:1]';
        front_ave_mag = mean( hor_sum(ind_front_ave) );
        % determining transition magnitudes
        % finding transision magnitude for blanking pulse
        trans_mag_blank = (porch_ave_mag + max([back_ave_mag front_ave_mag]))/2;
        trans_mag_synch = (synch_ave_mag + porch_ave_mag)/2;
        % finding indexes of transision points
        % finding the indexes of the rising edges
        ind_tmp = ind_front_ave(length(ind_front_ave));
        while (1)
            if (hor_sum(ind_tmp) > trans_mag_blank)
                ind_blank_rise = ind_tmp;
                break;
            end
            ind_tmp = ind_tmp+1;
        end
        while (1)
            if (hor_sum(ind_tmp) > trans_mag_synch)
                ind_synch_rise = ind_tmp;
                break;
            end
            ind_tmp = ind_tmp+1;
        end
```

APPENDIX-continued

```
        % finding indexes of falling edges
        ind_tmp = ind_synch_ave(length(ind_synch_ave))-10;
        while (1)
                if (hor_sum(ind_tmp) < trans_mag_synch)
                ind_synch_fall = ind_tmp;
                break;
                end
                ind_tmp = ind_tmp+1;
        end
        while (1)
                if (hor_sum(ind_tmp) < trans_mag_blank)
                ind_blank_fall = ind_tmp;
                break;
                end
                ind_tmp = ind_tmp+1;
        end
        % normalizing all index parameters assuming ind_blank_rise starts at 1
        ind_synch_rise = ind_synch_rise-ind_blank_rise+1+floor(samples_rise/2);
        ind_synch_fall = ind_synch_fall-ind_blank_rise+1+floor(samples_rise/2);
        ind_blank_fall = ind_blank_fall-ind_blank_rise+1+floor(samples_rise/2);
        sig_par(1) = samples_rise;
        sig_par(2) = ind_synch_rise;
        sig_par(3) = ind_synch_fall;
        sig_par(4) = ind_blank_fall;
    else
        samples_rise = sig_par(1);
        ind_synch_rise = sig_par(2);
        ind_synch_fall = sig_par(3);
        ind_blank_fall = sig_par(4);
    end
    % constructing the indices of a correlation signal based on the transitions
found
    ind_tmp = floor(samples_rise/2);
    cor_ind_pos = [ [1:samples_rise] [ind_synch_rise-ind_tmp: . . .
                    ind_synch_rise+ind_tmp] ];
    cor_ind_neg = [ [ind_synch_fall-ind_tmp:ind_synch_fall+ind_tmp]
    [ind_blank fall-ind_tmp: . . .
                    ind_blank_fall+ind_tmp] ];
    % performing correlation
    dif_cor = zeros(floor(hor_len),1);
    for loop = 1:hor_len
        dif_cor(loop) = sum(hor_sum(wrap(loop-1+cor_ind_pos,floor(hor_len)))) -
sum(hor_sum(wrap(loop-1+cor_ind_neg,floor(hor_len))));
    end
    cor_seg = dif_cor;
    start_ind = ind_synch - synch_len - front_porch - delta_front - slope_dur -
delta_slope;
    return;
end
if (cor_type = = 3)
    % samples to search over when searching for first gcr
    search_samples_synch2gcr = ceil( rate_uncertainty/f_ver_synch*f_s +
hor_synch_precision*f_s );
    % samples to search over going from one gcr to the next
    search_samples_gcr2gcr = ceil( rate_uncertainty/f_ver_synch*f_s );
    % search one vertical field for gcr waveform
    %
    % number horizontal segments in vertical segment
    num_hor_per_ver = ceil(f_hor_synch/f_ver_synch);
    % stores maximum correlation for each horizontal segment
    cor_max_vec = zeros(num_hor_per_ver,1);
    % stores index of maximum correlation for each horizontal segment
    ind_max_vec = zeros(num_hor_per_ver,1);
    for loop = 1:num_hor_per_ver
        % store results of the correlation searching sample by sample
        search_cor_vec = zeros(2*search_samples_synch2gcr+1,1);
        % stores the indices at which we search for ref signal
        search_ind vec =zeros(2*search_samples_synch2gcr+1,1);
        % samples resulting from the drift in the symbol clock
        samples_from_rate_offset = floor(f_s*rate_offset*loop/f_hor_synch);
        for loop1 = 1:search_samples_synch2gcr*2+1
            % index offset at which to search for ref signal
            ind_offset = loop1-search_samples_synch2gcr-1-samples_from_rate_offset;
            start_ind = floor(synch_corr_cross+time from_hor_synch*f_s+(loop-
1)*hor_len+ind_offset);
            search_cor_vec(loop1) = sig(start_ind:start_ind+gcr_len-1)'*gcr_chirp;
            search_ind_vec(loop1) = start_ind;
        end
```

APPENDIX-continued

```
        [search_cor_vec_max, search_cor_vec_max ind] = max (abs (search_cor_vec));
        cor_max_vec(loop) = search_car_vec(search_cor_vec_max_ind);
        ind_max_vec(loop) = search_ind_vec(search_cor_vec_max_ind);
    end
    % finding the maximum correlation result for whole vertical segment
    [tmp, ind_tmp] = max(abs(cor_max_vec));
    first_gcr_ind = ind_max_vec(ind_tmp);
    % resolving the 262/263 horizontal_segment ambiguity
    %
    % stores maximum correlation for each horizontal segment
    cor_max vec = zeros(2,1);
    % stores index of maximum correlation for each horizontal segment
    ind_max vec = zeros(2,1);
    for loop = 1:2
        % store results of the correlation searching sample by sample
        search_cor_vec = zeros(2*search_samples_gcr2gcr+1,1);
        % stores the indices at which we search for ref signal
        search_ind_vec = zeros(2*search_samples_gcr2gcr+1,1);
        % samples resulting from the drift in the symbol clock
        samples_from_rate_offset = floor(f_s*rate_offset/f_ver_synch);
        for loop1 = 1:search_samples_gcr2gcr*2+1
            % index offset at which to search from ref signal
            ind_offset = loop1-search_samples_gcr2gcr-1-samples_from_rate_offset;
            start_ind = first_gcr_ind+floor((262+loop-1)*hor_len+ind_offset);
            search_cor_vec(loop1) = sig(start_ind:start_ind+gcr_len-1)'*gcr_chirp;
            search_ind_vec(loop1) = start ind;
        end
        [search_cor_vec_max, search_cor_vec_max_ind] = max (abs (search_cor_vec));
        cor_max_vec(loop) = search_cor_vec(search_cor_vec_max_ind);
    end
    [tmp, ind_tmp] = max(abs(cor_max_vec));
    if (ind_tmp == 1)
        step_262 = 1;
    else
        step_262 = 0;
    end
    % computing combined correlation output
    %
    dropped_ind = first_gcr_ind-1;         % point at which correlatian begins -
effects pseudorange
    cor_seg = zeros(floor(har_len) ,1);
    num_ver = cell ((t_len-dropped_ind)*f_ver_synch/f_s) ;   % number of vertical
segments
    increment_ind = 0;                                       % tracks how far ahead of
first gcr segment
    for loop = 1:num_ver
        start_ind = max(1, floor(first_gcr_ind - protection_interval*f_s + . . .
                    increment ind - rate_offset*increment_ind));
        gcr_corr = zeros(floor(hor_len),1);
        for loop1 = 1:hor_len
            gcr_corr(loop1) = sig(start_ind+loop1-1:start_ind+loop1-
2+gcr_len)'gcr_chirp;
        end
        % gcr_corr maximum value may be positive or negative
        [tmp, tmp_ind] = max (abs (gcr_corr));
        %if (loop < 7)
        %   subplot(2,3,loop); plot(gcr_corr);
        %end
        cor_seg = cor_seg + gcr_corr*sign(gcr_corr (tmp_ind));
        % move to next gcr segment
        if (step_262 == 1)
            increment ind = increment_ind+262*hor_len;
            step_262 = 0;
        else
            increment ind = increment_ind+263*hor_len;
            step_262 = 1;
        end
    end
    start_ind = 0;
    return;
end
```

What is claimed is:

1. A method for determining the position of a user terminal, comprising:
   generating a correlation reference signal based on known characteristics of a broadcast analog television, ghost canceling reference signal;
   receiving, at the user terminal, a broadcast analog television signal comprising the ghost canceling reference signal; and
   correlating the broadcast analog television signal with the correlation reference signal, thereby producing a pseudorange; and wherein
   the location of the user terminal is determined based on the pseudorange and a location of the transmitter of the broadcast analog television signal.

2. The method of claim 1, further comprising:
   determining the location of the user terminal based on the pseudorange and the location of the transmitter of the broadcast analog television signal.

3. The method of claim 2, further comprising:
   determining the location of the user terminal based on the pseudorange, a pseudorange computed based on a broadcast digital television signal, and the locations of the transmitters of the broadcast analog television signal and the broadcast digital television signal.

4. The method of claim 1, further comprising:
   identifying the peak of the result of the correlating, thereby producing the pseudorange.

5. The method of claim 1, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

6. The method of claim 1, further comprising:
   determining a further pseudorange based on a further broadcast analog television signal; and
   projecting the pseudorange and the further pseudorange to an instant of time, thereby eliminating any first order term in the clock of the user terminal.

7. The method of claim 1, further comprising:
   tracking the ghost canceling reference signal using a time-gated delay-lock loop.

8. An apparatus for determining the position of a user terminal, comprising:
   means for generating a correlation reference signal based on known characteristics of a broadcast analog television ghost canceling reference signal;
   means for receiving, at the user terminal, a broadcast analog television signal comprising the ghost canceling reference signal; and
   means for correlating the broadcast analog television signal with the correlation reference signal, thereby producing a pseudorange; and wherein
   the location of the user terminal is determined based on the pseudorange and a location of the transmitter of the broadcast analog television signal.

9. The apparatus of claim 8, further comprising:
   means for determining the location of the user terminal based on the pseudorange and the location of the transmitter of the broadcast analog television signal.

10. The apparatus of claim 9, further comprising:
    determining the location of the user terminal based on the pseudorange, a pseudorange computed based on a broadcast digital television signal, and the locations of the transmitters of the broadcast analog television signal and the broadcast digital television signal.

11. The apparatus of claim 8, further comprising:
    means for identifying the peak of the result of the correlating, thereby producing the pseudorange.

12. The apparatus of claim 8, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

13. The apparatus of claim 8, further comprising:
    means for determining a further pseudorange based on a further broadcast analog television signal; and
    means for projecting the pseudorange and the further pseudorange to an instant of time, thereby eliminating any first order term in the clock of the user terminal.

14. The apparatus of claim 8, father comprising:
    means for tracking the ghost canceling reference signal using a time-gated delay-lock loop.

15. An apparatus for determining the position of a user terminal, comprising:
    a signal generator to generate a correlation reference signal based on known characteristics of a broadcast analog television ghost canceling reference signal;
    a receiver to receive, at the user terminal, a broadcast analog television signal comprising the ghost canceling reference signal; and
    a correlator to correlate the broadcast analog television signal with the correlation reference signal, thereby producing a pseudorange; and wherein
    the location of the user terminal is determined based on the pseudorange and a location of the transmitter of the broadcast analog television signal.

16. The apparatus of claim 15, further comprising:
    a processor to determine the location of the user terminal based on the pseudorange and the location of the transmitter of the broadcast analog television signal.

17. The apparatus of claim 16, wherein the processor determines the location of the user terminal based on the pseudorange, a pseudorange computed based on a broadcast digital television signal, and the locations of the transmitters of the broadcast analog television signal and the broadcast digital television signal.

18. The apparatus of claim 15, wherein the processor identifies the peak of the result of the correlating, thereby producing the pseudorange.

19. The apparatus of claim 15, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

20. The apparatus of claim 15, wherein the processor:
    determines a further pseudorange based on a further broadcast analog television signal; and
    projects the pseudorange and the further pseudorange to an instant of time, thereby eliminating any first order term in the clock of the user terminal.

21. The apparatus of claim 15, further comprising:
    a time-gated delay-lock loop to track the ghost canceling reference signal.

22. Computer-readable media embodying instructions executable by a computer to perform a method for determining the position of a user terminal, the method comprising:
- generating a correlation reference signal based on known characteristics of a broadcast analog television ghost canceling reference signal;
- receiving, at the user terminal, a broadcast analog television signal comprising the ghost canceling reference signal; and
- correlating the broadcast analog television signal with the correlation reference signal, thereby producing a pseudorange; and wherein
- the location of the user terminal is determined based on the pseudorange and a location of the transmitter of the broadcast analog television signal.

23. The media of claim 22, wherein the method further comprises:
- determining the location of the user terminal based on the pseudorange and the location of the transmitter of the broadcast analog television signal.

24. The media of claim 23, wherein the method further comprises:
- determining the location of the user terminal based on the pseudorange, a pseudorange computed based on a broadcast digital television signal, and the locations of the transmitters of the broadcast analog television signal and the broadcast digital television signal.

25. The media of claim 22, wherein the method further comprises:
- identifying the peak of the result of the correlating, thereby producing the pseudorange.

26. The media of claim 22, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

27. The media of claim 22, wherein the method further comprises:
- determining a further pseudorange based on a further broadcast analog television signal; and
- projecting the pseudorange and the further pseudorange to an instant of time, thereby eliminating any first order term in the clock of the user terminal.

28. The media of claim 22, wherein the method further comprises:
- tracking the ghost canceling reference signal using a time-gated delay-lock loop.

29. A method for determining the position of a user terminal, comprising:
- generating a correlation reference signal based on known characteristics of a chirp-type signal present in a broadcast analog television signal;
- receiving, at the user terminal, a broadcast analog television signal comprising the chirp-type signal; and
- correlating the broadcast analog television signal with the correlation reference signal, thereby producing a pseudorange; and wherein
- the location of the user terminal is determined based on the pseudorange and a location of the transmitter of the broadcast analog television signal.

30. The method of claim 29, wherein the chirp-type signal is a vertical interval test signal.

31. The method of claim 29, wherein the chirp-type signal is ghost canceling reference signal A, ghost canceling reference signal B, or ghost canceling reference signal C.

32. The method of claim 29, further comprising:
- determining the location of the user terminal based on the pseudorange and the location of the transmitter of the broadcast analog television signal.

33. The method of claim 32, further comprising:
- determining the location of the user terminal based on the pseudorange, a pseudorange computed based on a broadcast digital television signal, and the locations of the transmitters of the broadcast analog television signal and the broadcast digital television signal.

34. The method of claim 29, further comprising:
- identifying the peak of the result of the correlating, thereby producing the pseudorange.

35. The method of claim 29, wherein the position of the user terminal is determined by adjusting the: pseudoranges based on a difference between a transmitter clock at the transmitter of the broadcast analog television signal and a known time reference, and determining the position of the user terminal based on the adjusted pseudorange and the location of the TV transmitter.

36. The method of claim 29, further comprising:
- determining a further pseudorange based on a further broadcast analog television signal; and
- projecting the pseudorange and the further pseudorange to an instant of time, thereby eliminating any first order term in the clock of the user terminal.

37. The method of claim 29, further comprising:
- tracking the chirp-type signal using a time-gated delay-lock loop.

38. An apparatus for determining the position of a user terminal, comprising:
- means for generating a correlation reference signal based on known characteristics of a chirp-type signal present in a broadcast analog television signal;
- means for receiving, at the user terminal, a broadcast analog television signal comprising the chirp-type signal; and
- means for correlating the broadcast analog television signal with the correlation reference signal, thereby producing a pseudorange; and wherein
- the location of the user terminal is determined based on the pseudorange and a location of the transmitter of the broadcast analog television signal.

39. The apparatus of claim 38, wherein the chirp-type signal is a vertical interval test signal.

40. The method of claim 38, wherein the chirp-type signal is ghost canceling reference signal A, ghost canceling reference signal B, or ghost canceling reference signal C.

41. The apparatus of claim 38, further comprising:
- means for determining the location of the user terminal based on the pseudorange and the location of the transmitter of the broadcast analog television signal.

42. The apparatus of claim 41, further comprising:
- determining the location of the user terminal based on the pseudorange, a pseudorange computed based on a broadcast digital television signal, and the locations of the transmitters of the broadcast analog television signal and the broadcast digital television signal.

43. The apparatus of claim 38, further comprising:
- means for identifying the peak of the result of the correlating, thereby producing the pseudorange.

44. The apparatus of claim 38, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

45. The apparatus of claim 38, further comprising:
  means for determining a further pseudorange based on a further broadcast analog television signal; and
  means for projecting the pseudorange and the further pseudorange to an instant of time, thereby eliminating any first order term in the clock of the user terminal.

46. The apparatus of claim 38, further comprising:
  means for tracking the chirp-type signal using a time-gated delay-lock loop.

47. An apparatus for determining the position of a user terminal, comprising:
  a signal generator to generate a correlation reference signal based on known characteristics of a chirp-type signal present in a broadcast analog television signal;
  a receiver to receive, at the user terminal, a broadcast analog television signal comprising the chirp-type signal; and
  a correlator to correlate the broadcast analog television signal with the correlation reference signal, thereby producing a pseudorange; and wherein
  the location of the user terminal is determined based on the pseudorange and a location of the transmitter of the broadcast analog television signal.

48. The apparatus of claim 47, wherein the chirp-type signal is a vertical interval test signal.

49. The method of claim 47, wherein the chirp-type signal is ghost canceling reference signal A, ghost canceling reference signal B, or ghost canceling reference signal C.

50. The apparatus of claim 47, further comprising:
  a processor to determine the location of the user terminal based on the pseudorange and the location of the transmitter of the broadcast analog television signal.

51. The apparatus of claim 50, wherein the processor determines the location of the user terminal based on the pseudorange, a pseudorange computed based on a broadcast digital television signal, and the locations of the transmitters of the broadcast analog television signal and the broadcast digital television signal.

52. The apparatus of claim 47, wherein the processor identifies the peak of the result of the correlating, thereby producing the pseudorange.

53. The apparatus of claim 47, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

54. The apparatus of claim 47, wherein the processor:
  determines a further pseudorange based on a further broadcast analog television signal; and
  projects the pseudorange and the further pseudorange to an instant of time, thereby eliminating any first order term in the clock of the user terminal.

55. The apparatus of claim 47, further comprising:
  a time-gated delay-lock loop to track the chirp-type signal.

56. Computer-readable media embodying instructions executable by a computer to perform a method for determining the position of a user terminal, the method comprising:
  generating a correlation reference signal based on known characteristics of a chirp-type signal present in a broadcast analog television signal;
  receiving, at the user terminal, a broadcast analog television signal comprising the chirp-type signal; and
  correlating the broadcast analog television signal with the correlation reference signal, thereby producing a pseudorange; and wherein
  the location of the user terminal is determined based on the pseudorange and a location of the transmitter of the broadcast analog television signal.

57. The media of claim 56, wherein the chirp-type signal is a vertical interval test signal.

58. The method of claim 56, wherein the chirp-type signal is ghost canceling reference signal A, ghost canceling reference signal B, or ghost canceling reference signal C.

59. The media of claim 56, wherein the method further comprises:
  determining the location of the user terminal based on the pseudorange and the location of the transmitter of the broadcast analog television signal.

60. The media of claim 59, wherein the method further comprises:
  determining the location of the user terminal based on the pseudorange, a pseudorange computed based on a broadcast digital television signal, and the locations of the transmitters of the broadcast analog television signal and the broadcast digital television signal.

61. The media of claim 56, wherein the method further comprises:
  identifying the peak of the result of the correlating, thereby producing the pseudorange.

62. The media of claim 56, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

63. The media of claim 56, wherein the method further comprises:
  determining a further pseudorange based on a further broadcast analog television signal; and
  projecting the pseudorange and the further pseudorange to an instant of time, thereby eliminating any first order term in the clock of the user terminal.

64. The media of claim 56, wherein the method further comprises:
  tracking the chirp-type signal using a time-gated delay-lock loop.

* * * * *